(12) United States Patent
Kakinuma et al.

(10) Patent No.: US 11,540,229 B2
(45) Date of Patent: Dec. 27, 2022

(54) WIRELESS COMMUNICATION DEVICE AND WIRELESS COMMUNICATION METHOD

(71) Applicant: Sony Corporation, Tokyo (JP)

(72) Inventors: Koji Kakinuma, Tokyo (JP); Kosuke Aio, Tokyo (JP)

(73) Assignee: SONY CORPORATION, Tokyo (JP)

( * ) Notice: Subject to any disclaimer, the term of this patent is extended or adjusted under 35 U.S.C. 154(b) by 144 days.

(21) Appl. No.: 17/049,045

(22) PCT Filed: Apr. 12, 2019

(86) PCT No.: PCT/JP2019/015900
§ 371 (c)(1),
(2) Date: Oct. 20, 2020

(87) PCT Pub. No.: WO2019/208254
PCT Pub. Date: Oct. 31, 2019

(65) Prior Publication Data
US 2021/0051598 A1    Feb. 18, 2021

(30) Foreign Application Priority Data
Apr. 27, 2018  (JP) .................. JP2018-086250

(51) Int. Cl.
*H04W 52/16* (2009.01)
*H04L 27/26* (2006.01)
(Continued)

(52) U.S. Cl.
CPC ......... *H04W 52/16* (2013.01); *H04L 27/2607* (2013.01); *H04W 56/001* (2013.01); *H04W 84/12* (2013.01)

(58) Field of Classification Search
CPC ..................................................... H04W 52/16
See application file for complete search history.

(56) References Cited

U.S. PATENT DOCUMENTS

| 2007/0149238 | A1* | 6/2007 | Das | ........................ H04B 17/24 455/69 |
| 2010/0118995 | A1 | 5/2010 | Fukui | |

(Continued)

FOREIGN PATENT DOCUMENTS

| CN | 101765227 A | 6/2010 |
| JP | 2002-524965 A | 8/2002 |

(Continued)

OTHER PUBLICATIONS

International Search Report and Written Opinion dated Jul. 2, 2019 for PCT/JP2019/015900 filed on Apr. 12, 2019, 7 pages including English Translation of the International Search Report.

*Primary Examiner* — Jason E Mattis
(74) *Attorney, Agent, or Firm* — Xsensus LLP

(57) ABSTRACT

The present technique relates to a wireless communication device and a wireless communication method for enabling acquisition of control information even when a preamble signal cannot be acquired.
The wireless communication device includes an OFDM signal generation section that generates an OFDM signal in which at least one of plural resource units obtained by channel band division is set as a control information resource unit for transmitting control information. The present technique is, for example, applicable to a wireless communication device, etc. that performs wireless communication conforming to a standard such as IEEE 802.11.

18 Claims, 22 Drawing Sheets

| SUB-CARRIER POSITION | CONTROL INFORMATION NAME | INFORMATION |
|---|---|---|
| $b_1 \sim b_2$ | PRESENCE/ABSENCE OF CONTROL TONE INFORMATION | $b_1$: CONTROL TONE DOES NOT TRANSMIT INFORMATION $b_2$: CONTROL TONE TRANSMITS INFORMATION |
| $b_3$ | REFERENCE TONE | |
| $b_4 \sim b_9$ | BSS IDENTIFIER INFORMATION (USED WHEN CRU POSITON IS SAME) | IDENTIFIER INFORMATION FOR EACH BSS |
| $b_{10} \sim b_{21}$ | TRANSMISSION POWER INFORMATION | TRANSMISSION POWER VALUE INFORMATION |
| $b_{22}$ | REFERENCE TONE | |
| $b_{23} \sim b_{24}$ | UL/DL FLAG | $b_{23}$: DL COMMUNICATION $b_{24}$: UL COMMUNICATION |
| $b_{25} \sim b_{26}$ | PARITY BIT | ERROR DETECTION CODE $\begin{cases} b_{25}: \text{EVEN NUMBER} \\ b_{26}: \text{ODD NUMBER} \end{cases}$ |

(51) Int. Cl.
*H04W 56/00* (2009.01)
*H04W 84/12* (2009.01)

(56) References Cited

U.S. PATENT DOCUMENTS

| | | | |
|---|---|---|---|
| 2013/0039173 A1* | 2/2013 | Ehsan | H04W 52/146 |
| | | | 370/229 |
| 2016/0330741 A1* | 11/2016 | Kim | H04W 72/042 |
| 2017/0245224 A1* | 8/2017 | Barriac | H04W 52/343 |
| 2018/0263043 A1* | 9/2018 | Zhou | H04B 7/024 |

FOREIGN PATENT DOCUMENTS

| | | |
|---|---|---|
| JP | 2016-154286 A | 8/2016 |
| WO | WO-0014905 A | 3/2000 |
| WO | 2008/114541 A1 | 9/2008 |

* cited by examiner

FIG. 6

| SUB-CARRIER POSITION | CONTROL INFORMATION NAME | INFORMATION |
|---|---|---|
| $b_1 \sim b_2$ | PRESENCE/ABSENCE OF CONTROL TONE INFORMATION | $b_1$: CONTROL TONE DOES NOT TRANSMIT INFORMATION<br>$b_2$: CONTROL TONE TRANSMITS INFORMATION |
| $b_3$ | | REFERENCE TONE |
| $b_4 \sim b_9$ | BSS IDENTIFIER INFORMATION (USED WHEN CRU POSITION IS SAME) | IDENTIFIER INFORMATION FOR EACH BSS |
| $b_{10} \sim b_{21}$ | TRANSMISSION POWER INFORMATION | TRANSMISSION POWER VALUE INFORMATION |
| $b_{22}$ | | REFERENCE TONE |
| $b_{23} \sim b_{24}$ | UL/DL FLAG | $b_{23}$: DL COMMUNICATION<br>$b_{24}$: UL COMMUNICATION |
| $b_{25} \sim b_{26}$ | PARITY BIT | ERROR DETECTION CODE $\begin{pmatrix} b_{25}: \text{EVEN NUMBER} \\ b_{26}: \text{ODD NUMBER} \end{pmatrix}$ |

FIG. 14

| BSS IDENTIFIER | RECEPTION POWER | CH USE RATE | CRU |
|---|---|---|---|
| 2 | bb dBm | BB% | 2 |
| 3 | cc dBm | CC% | 3 |
| 4 | dd dBm | DD% | 4 |

FIG.16

| Format | Beam Change | UL/DL | MCS | DCM | BSS Color | CRU | ...... |

WIRELESS COMMUNICATION DEVICE AND WIRELESS COMMUNICATION METHOD

CROSS-REFERENCE TO RELATED APPLICATIONS

The present application is based on PCT filing PCT/JP2019/015900, filed Apr. 12, 2019, which claims priority to JP 2018-086250, filed Apr. 27, 2018, the entire contents of each are incorporated herein by reference.

TECHNICAL FIELD

The present technique relates to a wireless communication device and a wireless communication method, and particularly, relates to a wireless communication device and a wireless communication method for enabling acquisition of control information even when a preamble signal cannot be acquired.

BACKGROUND ART

IEEE 802.11, which is a wireless LAN (Local Area Network) standard, uses a mechanism, which is called CSMA/CA (Carrier Sense Multiple Access/Collision Avoidance), for avoiding mutual interference between terminals. Operation of CSMA/CA will be simply explained below. Before performing transmission, a terminal stands by for the transmission (back-off) for a random period of time (back-off time period). In addition, in a case of detecting a radio wave having power equal to or higher than a certain signal detection threshold as a result of observing the surrounding radio-wave environment (carrier sense) during the back-off, the terminal halts the back-off, waits until another terminal completes transmission, and resumes the back-off for the remaining back-of time period. With this mechanism involving back-off and carrier sense, a terminal can avoid collisions of packets while obtaining a transmission opportunity in an autonomous distributed manner.

Meanwhile, under IEEE 802.11ax, standardization of which is currently under consideration, a technology called Spatial Reuse (hereinafter, also referred to as SR) for enabling transmission of a packet by adjusting a detection threshold and transmission power even when a signal from a peripheral terminal is detected is being examined in order to solve a problem that transmission is excessively inhibited by CSMA/CA due to recent increase of wireless LAN terminals. In SR, a terminal reads out a BSS (Basic Service Set) identifier and transmission power information included in a preamble signal, which is a header part of a received signal, and, when having determined that the received signal has been transmitted not from a BSS to which the terminal itself belongs but from an OBSS (Overlapping BSS) which is an adjacent BSS, the terminal controls the transmission power of the terminal itself so as not to exert any influence on the OBSS, and then, performs transmission.

The information regarding identification of a BSS and control information for deciding the transmission power described above are all included in the preamble signal. However, in a case where the terminal has already started transmission or reception when a preamble signal arrives at the terminal, the terminal cannot receive the preamble signal, and thus, cannot acquire control information included in the preamble signal.

Therefore, there has been a demand for a method for, without demodulating data, enabling acquisition of control information in a packet a preamble signal of which could not be acquired.

For example, PTL 1 discloses a method for enabling sense-value information transmission according to the position of a tone signal which is used by each sensor to perform transmission/reception, in order to eliminate overhead caused by a header in a wireless sensor network. According to this method, an effect of acquiring information even from some midpoint of a packet without involving data demodulation can be expected.

CITATION LIST

Patent Literature

[PTL 1]
  Japanese Patent Laid-Open No. 2016-154286

SUMMARY

Technical Problem

However, in PTL 1, all of the bands can be used for information transmission using tone signals because it is sufficient that only sensor values are collected as targets. Yet, in a wireless LAN, not only control information but also a data part needs to be transmitted. Accordingly, it is difficult to apply the method of PTL 1 to wireless LAN systems.

The present technique has been developed in view of these circumstances and enables acquisition of control information even when a preamble signal cannot be acquired.

Solution to Problem

A wireless communication device according to a first aspect of the present technique includes an OFDM signal generation section that generates an OFDM signal in which at least one of plural resource units obtained by channel band division is set as a control information resource unit for transmitting control information.

A wireless communication method according to the first aspect of the present technique includes, by a wireless communication device, generating an OFDM signal in which at least one of plural resource units obtained by channel band division is set as a control information resource unit for transmitting control information.

In the first aspect of the present technique, an OFDM signal in which at least one of plural resource units obtained by channel band division is set as a control information resource unit for transmitting control information is generated.

A wireless communication device according to a second aspect of the present technique includes a reception section that receives an OFDM signal in which at least one of plural resource units obtained by channel band division is set as a control information resource unit for transmitting control information.

A wireless communication method according to the second aspect of the present technique includes, by a wireless communication device, receiving an OFDM signal in which at least one of plural resource units obtained by channel band division is set as a control information resource unit for transmitting control information.

In the second aspect of the present technique, an OFDM signal in which at least one of plural resource units obtained by channel band division is set as a control information resource unit for transmitting control information is received.

Each of the wireless communication devices may be an independent device or may be an internal block constituting a single apparatus.

Advantageous Effect of Invention

According to the first and second aspects of the present technique, control information can be acquired even when a preamble signal cannot be acquired.

It is to be noted that the above effect is not necessarily limitative. Any of effects described in the present disclosure may be provided.

BRIEF DESCRIPTION OF DRAWINGS

FIG. 6 is a diagram depicting an example of allocating control information in a CRU.

FIG. 14 is a diagram depicting an example of a peripheral BSS list.

FIG. 16 is a diagram depicting a format example of a preamble signal.

DESCRIPTION OF EMBODIMENT

Hereinafter, explanations will be given of a mode for carrying out the present technique (hereinafter, referred to as an embodiment). It is to be noted that the explanations will be given in the following order.

1. Configuration Example of Wireless Communication System
2. Problems in Spatial Reuse Technique and Outline of Present Technique
3. Configuration Example of Wireless Communication Device
4. Detailed Configuration Example of OFDM Signal Generation Section
5. Detailed Configuration Example of CRU Detection Section
6. OFDM Signal Transmitting Process
7. Detailed Process of Determining CRU
8. OFDM Signal Receiving Process
9. Specific Example of Executing SR
10. Configuration Example of Computer <1. Configuration Example of Wireless Communication System>

Figure 1:
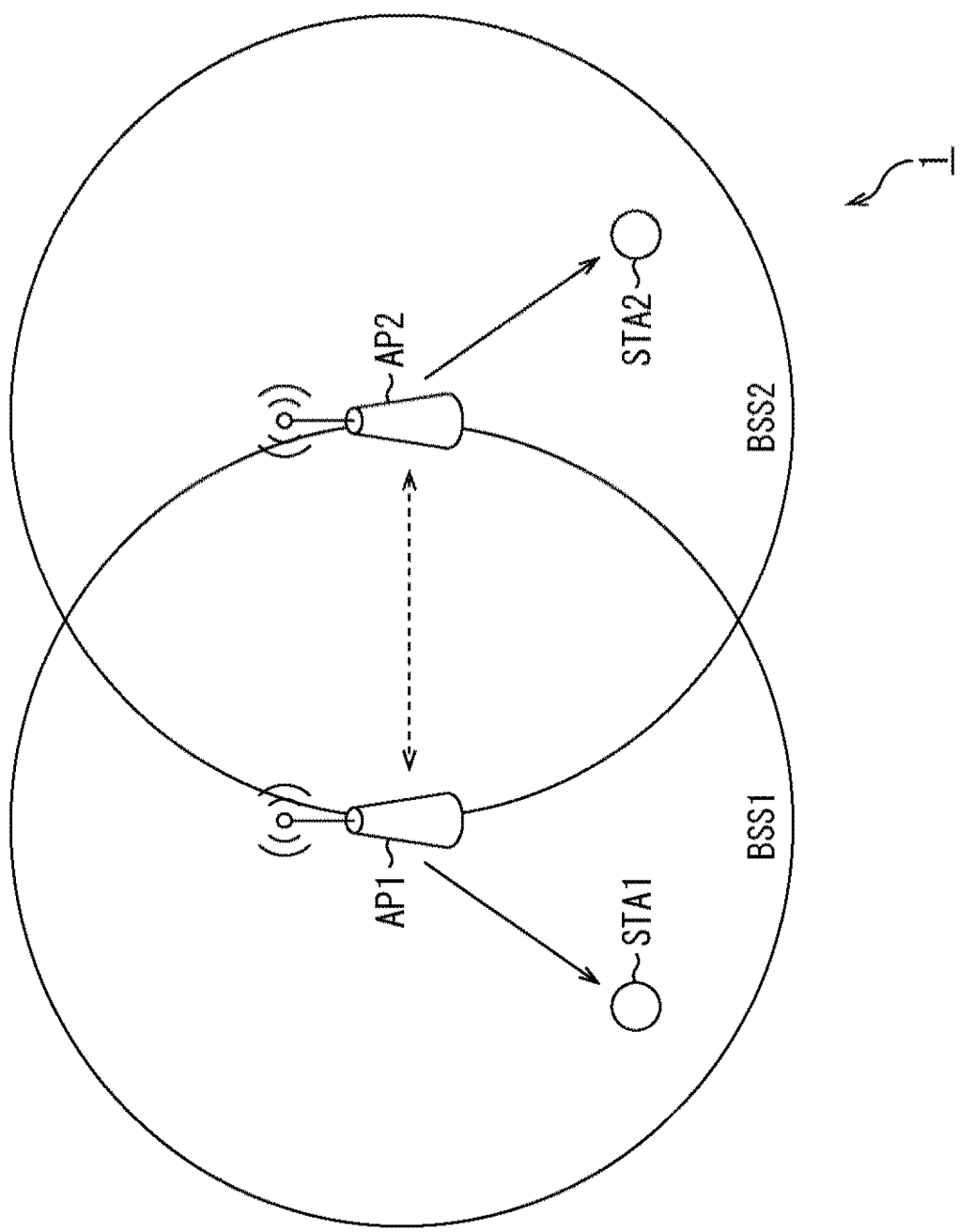
FIG. 1 is a diagram depicting a configuration example of a wireless communication system as an embodiment to which the present technique is applied.

FIG. 1 depicts a configuration example of a wireless communication system as an embodiment to which the present technique is applied.

A wireless communication system 1 of FIG. 1 constitutes, for example, a wireless LAN (Local Area Network) standardized by IEEE (Institute of Electrical and Electronic Engineers) 802.11 and includes a plurality of base stations AP (Access Points) including a plurality of BSSs (Basic Service Sets) and slave stations STA (Station) connected to the respective base stations AP. The base stations AP and the slave stations STA are wireless communication devices that perform wireless communication standardized by IEEE 802.11.

More specifically, the wireless communication system 1 includes base stations AP1 and AP2 and slave stations STA1 and STA2. The slave station STA1 is connected to the base station AP1, and the slave station STA2 is connected to the base station AP2. The base station AP1 and the slave station STA1 constitute a BSS1, and the base station AP2 and the slave station STA2 constitute a BSS2. The slave station STA1 wirelessly communicates with the base station AP1, and the slave station STA2 wirelessly communicates with the base station AP2. The BSS1 and the BSS2 are in a positional relation to interfere with each other. The base stations AP1 and AP2 are in the positional relation of being able to perform mutual detection of signals.

It is to be noted that the number of BSSs constituting the wireless communication system 1 depicted in FIG. 1, the number of base stations AP, and the number of slave stations STA that perform communication upon being connected to the base stations AP can be selected freely. These numbers are not limited to those depicted in FIG. 1.

<2. Problems in Spatial Reuse Technique and Outline of Present Technique>

By using a spatial reuse technique that is currently under review for IEEE 802.11ax which is a wireless LAN standard, each of the base stations AP1 and AP2 in FIG. 1 can transmit a packet by adjusting a detection threshold and transmission power even when a signal from a peripheral base station AP is detected.

Figure 2:
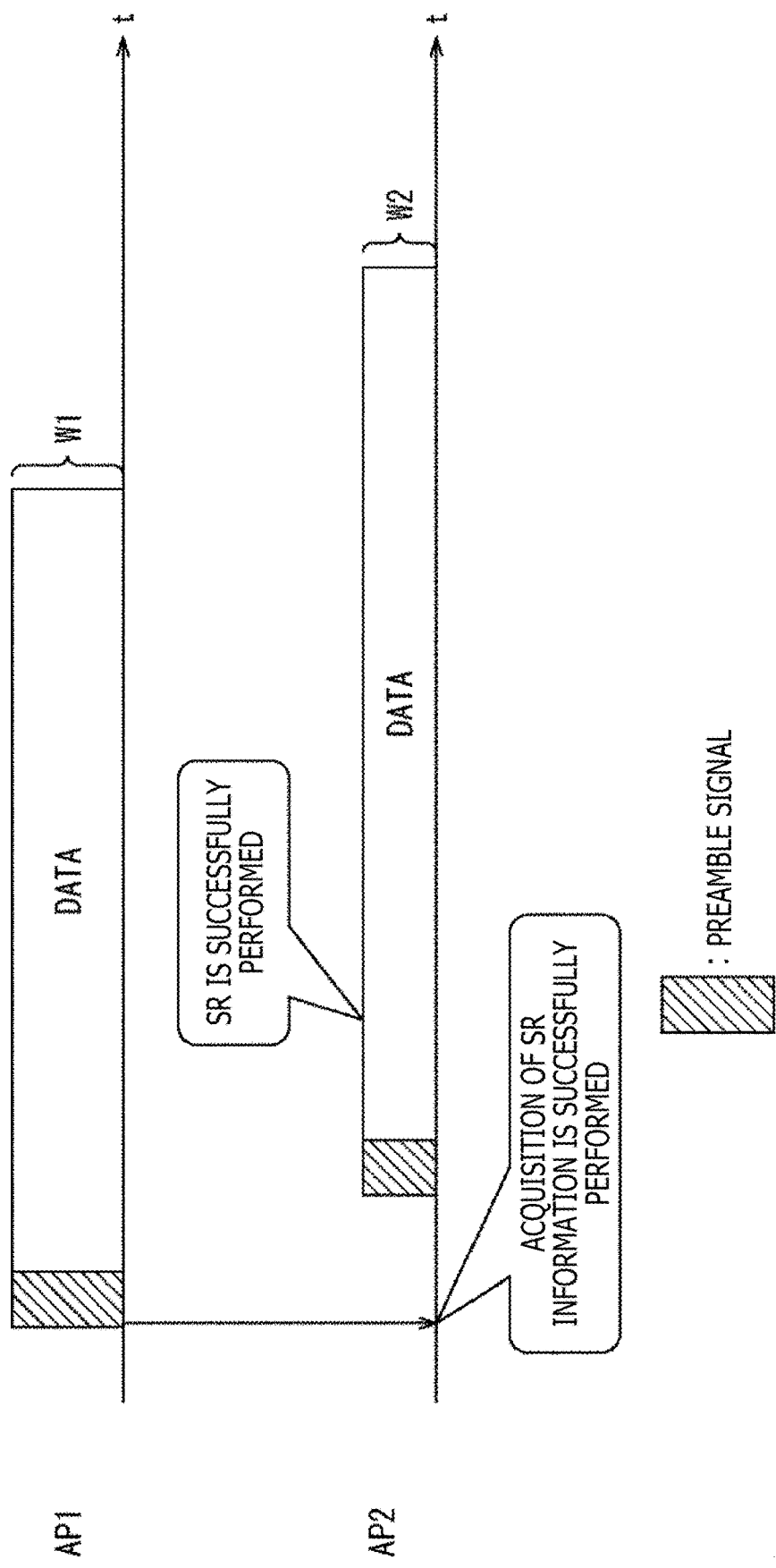
FIG. 2 is a diagram for explaining operation in a spatial reuse technique.

With reference to FIG. 2, operation of the spatial reuse technique that is under review for IEEE 802.11ax will be explained.

FIG. 2 is a schematic diagram depicting packet transmission at the base stations AP1 and AP2. The horizontal axis represents time while the vertical axis represents transmission power.

For example, the base station AP1 transmits a packet in which control information (hereinafter, also referred to as SR information) that is necessary to execute spatial reuse is stored in a preamble signal. Examples of SR information include a BSS identifier for identifying the BSS (BSS1) of the base station AP1, transmission power information, and duration information.

The base station AP2 receives the preamble signal in the packet transmitted from the base station AP1 and acquires the SR information written in the preamble signal. After acquiring the SR information, the base station AP2 determines that the packet has not been transmitted from the BSS to which the base station AP2 belongs, on the basis of the BSS identifier included in the SR information, for example, so that reception of the packet can be terminated.

Further, the base station AP2 calculates, from reception power of the packet and another item (for example, transmission power information, duration information, or the like) of the SR information, a parameter (transmission parameter) such as transmission power or transmission time that does not hinder packet transmission from the base station AP1 and starts packet transmission by using the set transmission parameter while the packet is being transmitted from the base station AP1.

Transmission power W2 of the packet from the base station AP2 is set to be lower than transmission power W1 of the packet from the base station AP1. The transmission power W1 of the packet from the base station AP1 is assumed to be maximum transmission power, for example.

As explained so far, the spatial reuse technique allows the base station AP1 and the base station AP2 to perform packet transmission at the same time while not mutually affecting the transmission. Accordingly, enhancement of the system throughput by increased transmission opportunities is expected.

Figure 3:
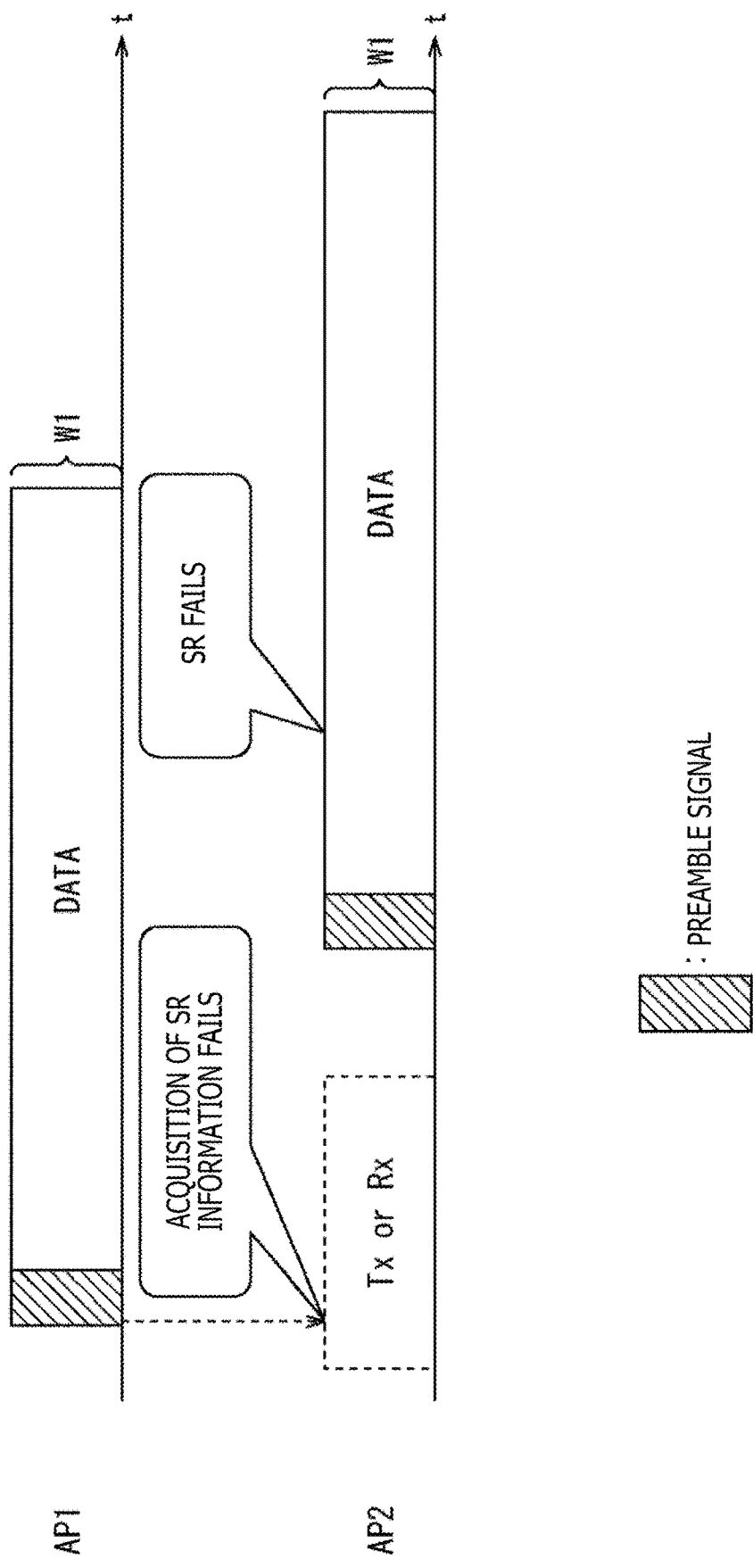
FIG. 3 is a diagram for explaining an assumed problem in a spatial reuse technique.

With reference to FIG. 3, problems that are assumed to arise in the spatial reuse technique will be explained.

In order to determine whether or not packet transmission can be performed and to decide a transmission parameter, the base station AP2 needs to receive a preamble signal in a packet and acquire SR information, as explained previously with reference to FIG. 2.

However, in a case where the base station AP2 is executing a different process (for example, is transmitting a packet or is receiving another packet) at a start time of packet transmission from the base station AP1, the base station AP2 is unable to acquire a preamble signal of the packet from the base station AP1. At a point of time when the base station AP2 has completed the different process, the base station AP2 has missed the preamble signal of the packet from the base station AP1 so that the base station AP2 is unable to acquire SR information. Accordingly, the base station AP2 is unable to determine whether or not packet transmission can be performed or to set a transmission parameter.

The base station AP2 can recognize the packet transmitted from the base station AP1 as an interference signal having no information, and thus, can determine whether or not transmission can be performed, on the basis of an energy detection threshold. However, in a case where the power of the interference signal is equal to or greater than the energy detection threshold, the base station AP2 is unable to perform packet transmission so that an opportunity to execute spatial reuse is lost. On the other hand, in a case where the power of the interference signal is lower than the energy detection threshold, the base station AP2 is able to perform packet transmission but is unable to recognize what kind of signal the interference signal is. Thus, the base station AP2 is unable to properly adjust a transmission parameter. For example, as depicted in FIG. 3, packet transmission is started with the maximum transmission power W1 such that a situation in which the packet transmission hinders packet transmission from the base station AP1 occurs.

Figure 4:
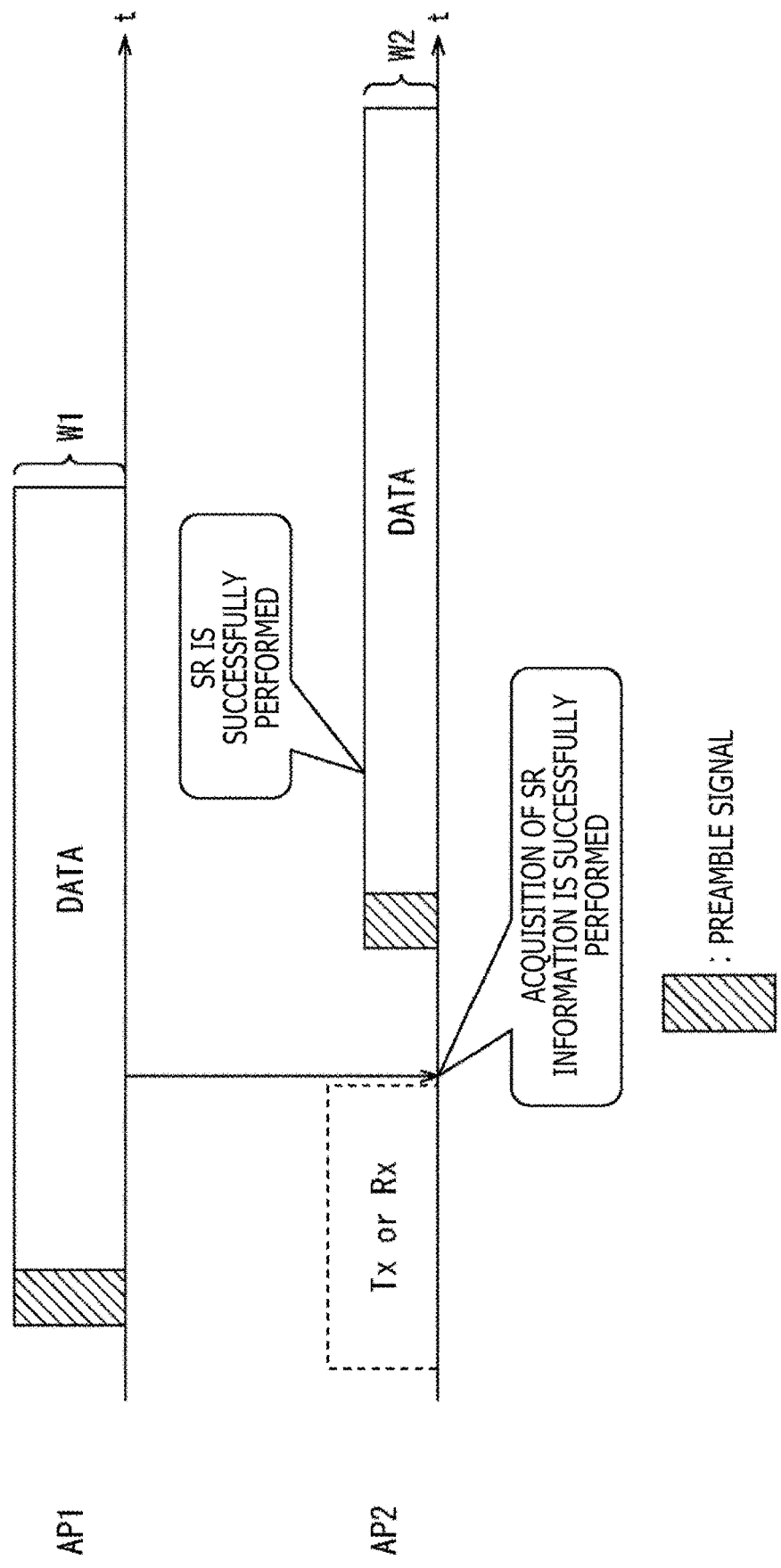
FIG. 4 is a schematic diagram depicting packet transmission which can be implemented by the wireless communication system of FIG. 1.

FIG. 4 is a schematic diagram depicting packet transmission which can be implemented by the wireless communication system 1 of FIG. 1.

The wireless communication system 1 of FIG. 1 is configured such that necessary SR information can be acquired even in a case where the base station AP2 has missed reception of a preamble signal of a packet from the base station AP1 because the base station AP2 is executing a different process at a start time of packet transmission from the base station AP1, as depicted in FIG. 4.

Accordingly, the base station AP2 is able to determine whether or not the base station AP2 can perform packet transmission and to adjust a transmission parameter, for example. Thus, loss of an opportunity to execute spatial reuse, which is caused when the base station AP2 refrains from transmitting any packet, can be avoided, and packet transmission that affects packet transmission from another base station AP can be avoided.

A method of acquiring, at a base station AP in the wireless communication system 1, necessary SR information from some midpoint of a packet even when reception of a preamble signal has been missed, will be explained with reference to FIGS. 5 and 6.

In wireless LANs, basically, a channel that is currently not used in a separate BSS is selected from among plural channels. However, in an environment (dense environment) where the density of base stations installed per unit area is increased such that the distance between BSS is shortened, there is a limit on selection of different channels for different BSSs. Therefore, in the present embodiment, a state in which different BSSs use the same channel is assumed.

The base station AP divides, for example, a 20-MHz channel band into multiple units (uniform division). Here, units in this division are referred to as an RU (resource unit).

Figure 5:
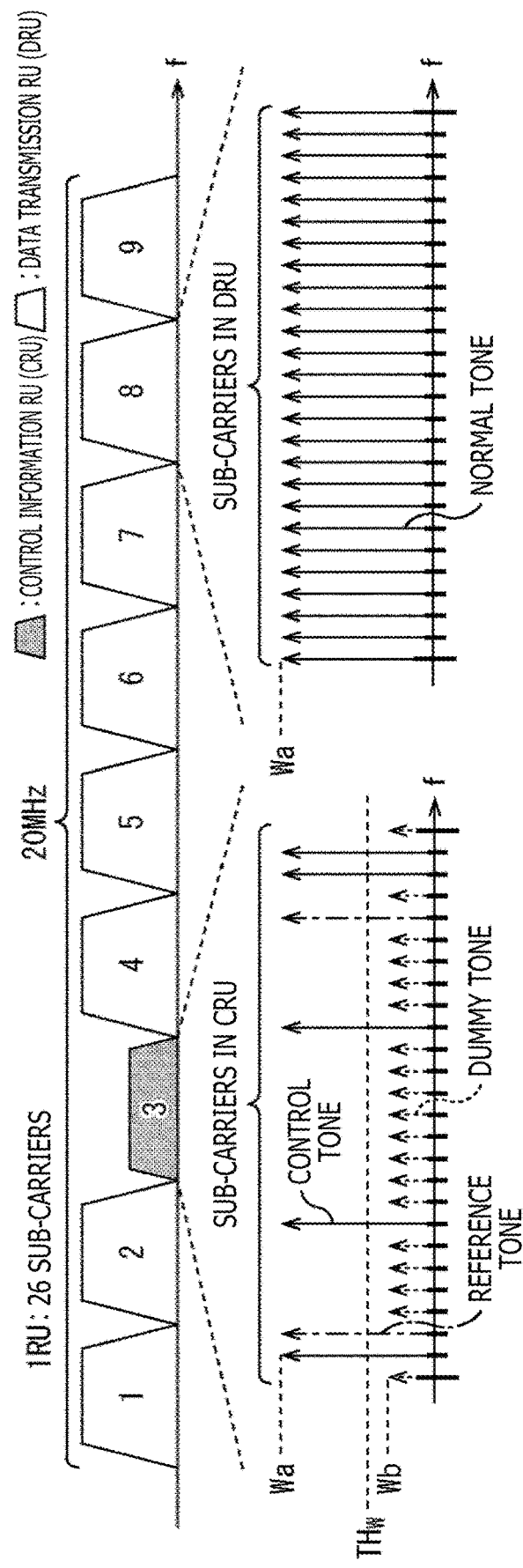
FIG. 5 is a diagram depicting an example of an OFDM signal in the wireless communication system of FIG. 1.

FIG. 5 depicts an example of an OFDM signal generated by the base station AP. In FIG. 5, the horizontal axis indicates a frequency while the vertical axis indicates a power level. Moreover, in FIG. 5, vertical arrows each indicate a sub-carrier.

FIG. 5 depicts an example in which a 20-MHz channel band is divided into 9 RUs and each of the RUs consists of 26 sub-carriers. The 9 divided RUs are identified by being numbered 1, 2, 3, . . . 9 in order from the lowest frequency. Hereinafter, these RUs are also referred to as RU1, RU2, RU3, . . . RU9.

It is to be noted that, in a case where each RU consists of 26 sub-carriers and 9 RUs are given, the total number of sub-carriers is 234. However, the number of sub-carriers constituting one channel is usually greater than 234 because a pilot tone or the like is further added.

The base station AP allocates a predetermined one of plural RUs in a channel, as a control information RU (hereinafter referred to as a CRU) for transmitting control information (SR information) which is necessary to execute spatial reuse, and allocates the remaining RUs as data transmission RUs (hereinafter, referred to as a DRU) for transmitting data. Here, in a case where the position of the CRU among plural RUs in a channel band is different, it is indicated that different BSSs are used. However, a mere distinction based on a CRU position allows only 9 BSSs to be handled at most in the example in FIG. 5. Therefore, a configuration in which, even when the position of a CRU is the same, a BSS can further be identified according to sub-carrier positions in the CRU is provided, as explained later.

Signal power of each of the sub-carriers constituting a DRU is set to a predefined power level Wa which is used for normal data transmission.

Each of the sub-carriers constituting a CRU includes any of a reference tone (Reference Tone) which is a pilot sub-carrier, a control tone (Control Tone) which is a sub-carrier representing predetermined control information, or a dummy tone (Dummy Tone). In the RU3 which is a CRU in FIG. 5, each reference tone is indicated by a vertical one dotted chain arrow, each control tone is indicated by a vertical solid arrow, and each dummy tone is indicated by a vertical dotted arrow.

Signal power of a reference tone and signal power of a control tone are set to the power level Wa, similarly to the signal power of each of sub-carriers constituting a DRU. Signal power of a dummy tone is set to a power level Wb which is lower than a threshold THw which is given to allow a reception side to discriminate between a control tone and a dummy tone. In other words, a control tone is a sub-carrier having a power, and a dummy tone is a sub-carrier having no power.

In a CRU, the number of sub-carriers that are other than reference tones and are set as control tones in a CRU is equal to the number of control information sets to be transmitted by the CRU. In the example in FIG. 5, five sub-carriers are set as control tones, and five control information sets are transmitted. The number of control information sets to be transmitted as SR information and the positions of the reference tones are determined in advance and are already known to the transmission side and the reception side. Therefore, in this example, the number of control tones should be five. The reception side determines whether or not the number of detected control tones is equal to the number of control information sets transmitted as SR information. Accordingly, the reception side can determine whether or not the SR information has been received properly.

In a CRU, the number of control tones set to the power level Wa which is as high as that of each of sub-carriers in a DRU is set to be smaller than the number of dummy tones set to the power level Wb which is lower than the power level Wa. Thus, as depicted in the upper part of FIG. 5, the average power value in the CRU is lower than that in the DRUs, and the CRU has the lowest power among the RUs.

Therefore, a wireless communication device that has received the signal depicted in FIG. 5 can identify the CRU by detecting an RU having the lowest power among the RUs. In the example in FIG. 5, the RU3 is the CRU.

FIG. 6 depicts an example of allocating five sets of control information in a CRU.

In the example in FIG. 6, five sets of control information, i.e., the presence/absence of control tone information, a BSS identifier, transmission power information, an UL/DL flag, and a parity bit, are transmitted.

Sub-carrier positions refer to the positions of 26 sub-carriers constituting a CRU, which are defined as $b_1$, $b_2$, ..., $b_{26}$ in order from the lowest frequency.

Sub-carriers at the sub-carrier positions $b_1$ and $b_2$ are used to indicate the presence/absence of control tone information. For example, in a case where the sub-carrier at the sub-carrier position $b_1$ is 1, i.e., a control tone while the sub-carrier at the sub-carrier position $b_2$ is 0, i.e., a dummy tone, it is indicated that there is no transmission of control information by the control tone. On the other hand, in a case where the sub-carrier at the sub-carrier position $b_1$ is 0, i.e., a dummy tone while the sub-carrier at the sub-carrier position $b_2$ is 1, i.e., a control tone, it is indicated that there is transmission of control information by the control tone.

A sub-carrier at the sub-carrier position $b_3$ is a reference tone.

Sub-carriers at the sub-carrier positions $b_4$ to $b_9$ are used to indicate BSS identifier information for identifying a BSS. Any one of the sub-carriers at the sub-carrier positions $b_4$ to $b_9$ is set as a control tone. In a case where the sub-carrier positions $b_4$ to $b_9$ are different, it is indicated that different BSSs are used. The BSS identifier information in the sub-carrier positions $b_4$ to $b_9$ is used when the CRU position is the same.

Sub-carriers at the sub-carrier positions $b_{10}$ to $b_{21}$ are used to indicate transmission power information. For example, in a case where maximum transmission power is set to 23 dB and the transmission power is maximum (23 dB), the sub-carrier at the sub-carrier position $b_{10}$ is set to 1, i.e., a control tone, and the control tone position is changed by each 1 dB. That is, when the transmission power is 22 dB, the sub-carrier at the sub-carrier position $b_{11}$ is set as a control tone. When the transmission power is 21 dB, the sub-carrier at the sub-carrier position $b_{12}$ is set as a control tone. When the transmission power is 20 dB, the sub-carrier at the sub-carrier position $b_{13}$ is set as a control tone. The same applies to the sub-carrier position $b_{14}$ and subsequent sub-carrier positions. Sub-carrier positions may be changed by every several dB, instead of each 1 dB.

A sub-carrier at the sub-carrier position $b_{22}$ is a reference tone.

Sub-carriers at the sub-carrier positions $b_{23}$ and $b_{24}$ are used to indicate a UL/DL flag. For example, in a case where the sub-carrier at the sub-carrier position $b_{23}$ is set as a control tone, the sub-carrier indicates DL communication (DL: DownLink). In a case where the sub-carrier at the sub-carrier position $b_{24}$ is set as a control tone, the sub-carrier indicates UL communication (UL: UpLink).

Sub-carriers at the sub-carrier positions $b_{25}$ and $b_{26}$ are used to indicate a parity bit which is an error detection code. For example, in a case where the sub-carrier at the sub-carrier position $b_{25}$ is set as a control tone, the parity bit is an even number. In a case where the sub-carrier at the sub-carrier position $b_{26}$ is set as a control tone, the parity bit is an odd number. It is to be noted that, in a case where more sub-carriers can be allocated for error detection or correction, the parity bit may be a more advanced error correction code such as CRC (Cyclic Redundancy Check).

The abovementioned OFDM signal is transmitted and received so that which RU is used as a CRU is written in a signal and the signal is transmitted to the slave stations STA in the same BSS and to the base station AP and slave stations STA in the peripheral BSS, whereby SR information can be shared, as appropriate.

It is to be noted that the number of control information sets to be transmitted as SR information and the number of sub-carriers that are allocated to the control information sets are not limited to those in the example of FIG. 6 and can be determined freely. For example, the number of sub-carriers that are allocated to transmission power may be reduced, and the number of sub-carriers that are allocated to BSS identifier information may be increased. For example, when 7 sub-carriers are allocated to BSS identifier information, 9

BSSs can be identified according to the RU positions. Thus, 9×7=63 BSSs, which correspond to 1-byte information, can be identified.

In addition, the number of sub-carriers of one RU and the band of one RU may also be changeable according to SR information to be transmitted.

Hereinafter, a detailed configuration of a wireless communication device that operates as one of the base stations AP or the slave stations STA of FIG. 1 will be explained.

<3. Configuration Example of Wireless Communication Device>

Figure 7:
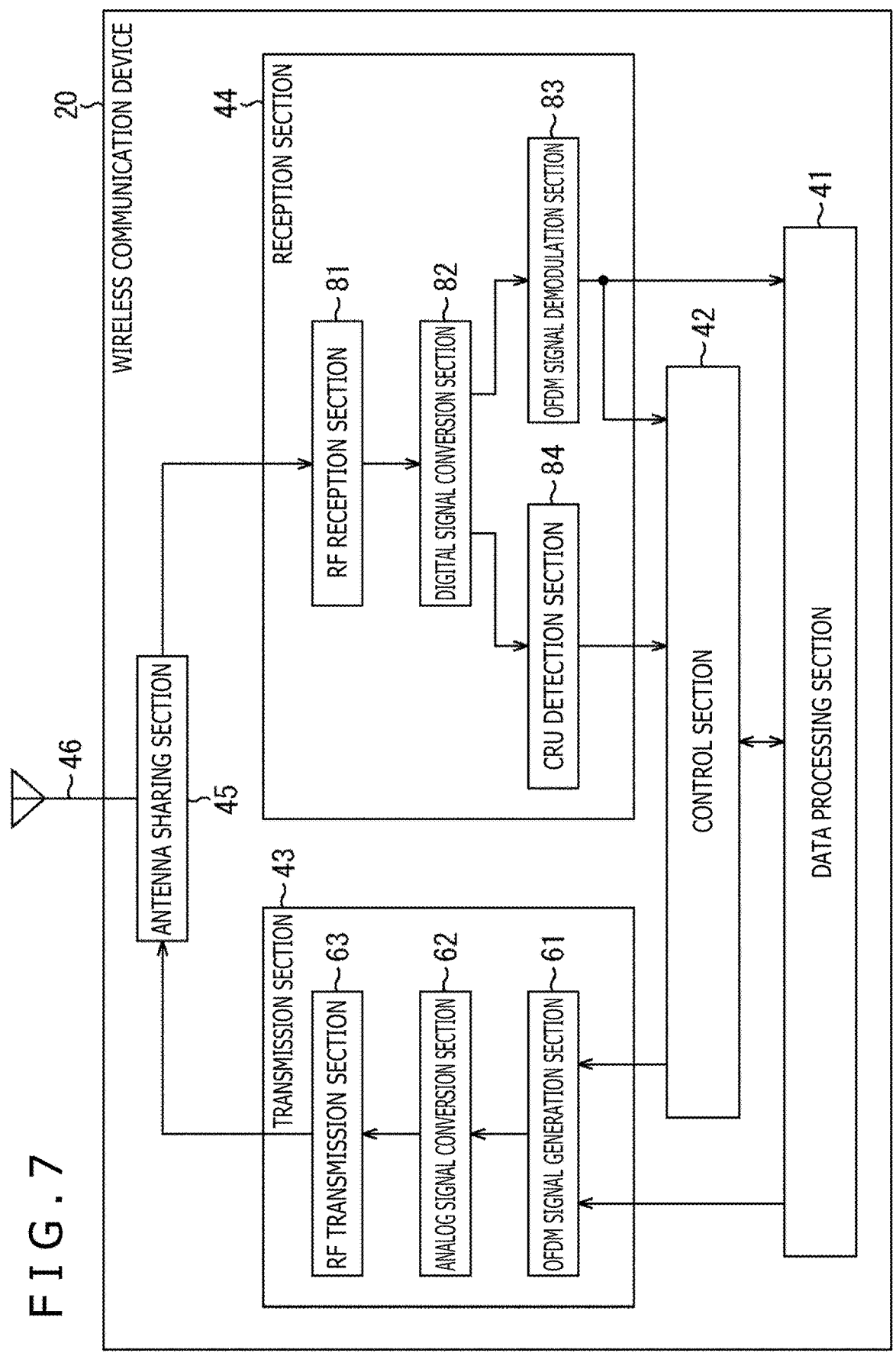
FIG. 7 is a block diagram depicting a configuration example of a wireless communication device.

FIG. 7 is a block diagram depicting a configuration example of a wireless communication device that operates as one of the base stations AP or the slave stations STA of FIG. 1.

A wireless communication device 20 of FIG. 7 includes a data processing section 41, a control section 42, a transmission section 43, a reception section 44, an antenna sharing section 45, and an antenna 46. The transmission section 43 includes an OFDM signal generation section 61, an analog signal conversion section 62, and an RF transmission section 63. The reception section 44 includes an RF reception section 81, a digital signal conversion section 82, an OFDM signal demodulation section 83, and a CRU detection section 84.

The data processing section 41 processes a data signal for communication. Specifically, the data processing section 41 generates a data signal that is included in a packet to be transmitted, and extracts a data signal from a demodulated reception signal. Information to be included in a preamble signal is also generated at the data processing section 41.

The control section 42 generally controls operation of the whole of the wireless communication device 20. For example, during a packet transmission time, the control section 42 decides one or more control information sets to be transmitted as SR information, and decides the position (hereinafter, also referred to a CRU position, as appropriate) of an RU to serve as a CRU and the positions (hereinafter, also referred to as control tone positions, as appropriate) of sub-carriers to be set as control tones, on the basis of the decided control information. Moreover, during a packet reception time, the control section 42 controls operation of the transmission section 43 and operation of the reception section 44, etc., on the basis of a detection result on a CRU and control tones supplied from the CRU detection section 84.

The transmission section 43 generates a packet to be transmitted via the antenna 46, by using the data signal generated by the data processing section 41, The OFDM signal generation section 61 generates an OFDM signal on the basis of the transmission data generated by the data processing section 41. In addition, the OFDM signal generation section 61 acquires, from the control section 42, an RU to serve as a CRU and the sub-carrier positions of control tones in the CRU and generates an OFDM signal in which designated sub-carriers in the CRU are set as control tones while other sub-carriers are set as dummy tones. It is to be noted that predetermined sub-carriers in the CRU are set as reference tones.

The analog signal conversion section 62 performs DA conversion of the OFDM signal generated by the OFDM signal generation section 61 into an analog signal.

The RF transmission section 63 generates a transmission signal to be outputted from the antenna 46, by performing frequency conversion (up-conversion) or power amplification on the analog signal generated by the analog signal conversion section 62, and supplies the transmission signal to the antenna sharing section 45.

The antenna sharing section 45 emits, in a form of electromagnetic waves, the transmission signal generated by the transmission section 43 to the air via the antenna 46. In addition, the antenna sharing section 45 receives a reception signal via the antenna 46 and supplies the reception signal to the reception section 44.

The reception section 44 extracts data and acquires control information from the reception signal received via the antenna 46.

The RF reception section 81 includes an LNA (Low Noise Amplifier) and an AGC (Auto Gain Control) section, to perform frequency conversion (down-conversion) or power amplification on the reception signal received via the antenna 46, so that conversion to an analog signal that can easily be converted to a digital signal is performed. The gain of the LNA is controlled by an AGC section on the basis of reception power of a signal detected by the CRU detection section 84 or the OFDM signal demodulation section 83.

The digital signal conversion section 82 performs AD conversion of the analog signal obtained by the processing at the RF reception section 81 into a digital signal.

The OFDM signal demodulation section 83 detects a preamble signal positioned at the head of a packet, and then, demodulates a data signal from an OFDM signal by performing synchronization, channel estimation, phase correction, etc. of the OFDM signal with use of the preamble signal. The demodulated data is supplied to the data processing section 41 or the control section 42.

The CRU detection section 84 detects an OFDM signal from among signals supplied from the digital signal conversion section 82. Subsequently, the CRU detection section 84 measures respective reception power of each of RUs in a channel, thereby detecting a CRU. Moreover, the CRU detection section 84 measures respective reception power of each of sub-carriers in the CRU, thereby detecting control tones. The CRU detection result and the control tone detection result are supplied to the control section 42.

<4. Detailed Configuration Example of OFDM Signal Generation Section>

Figure 8:
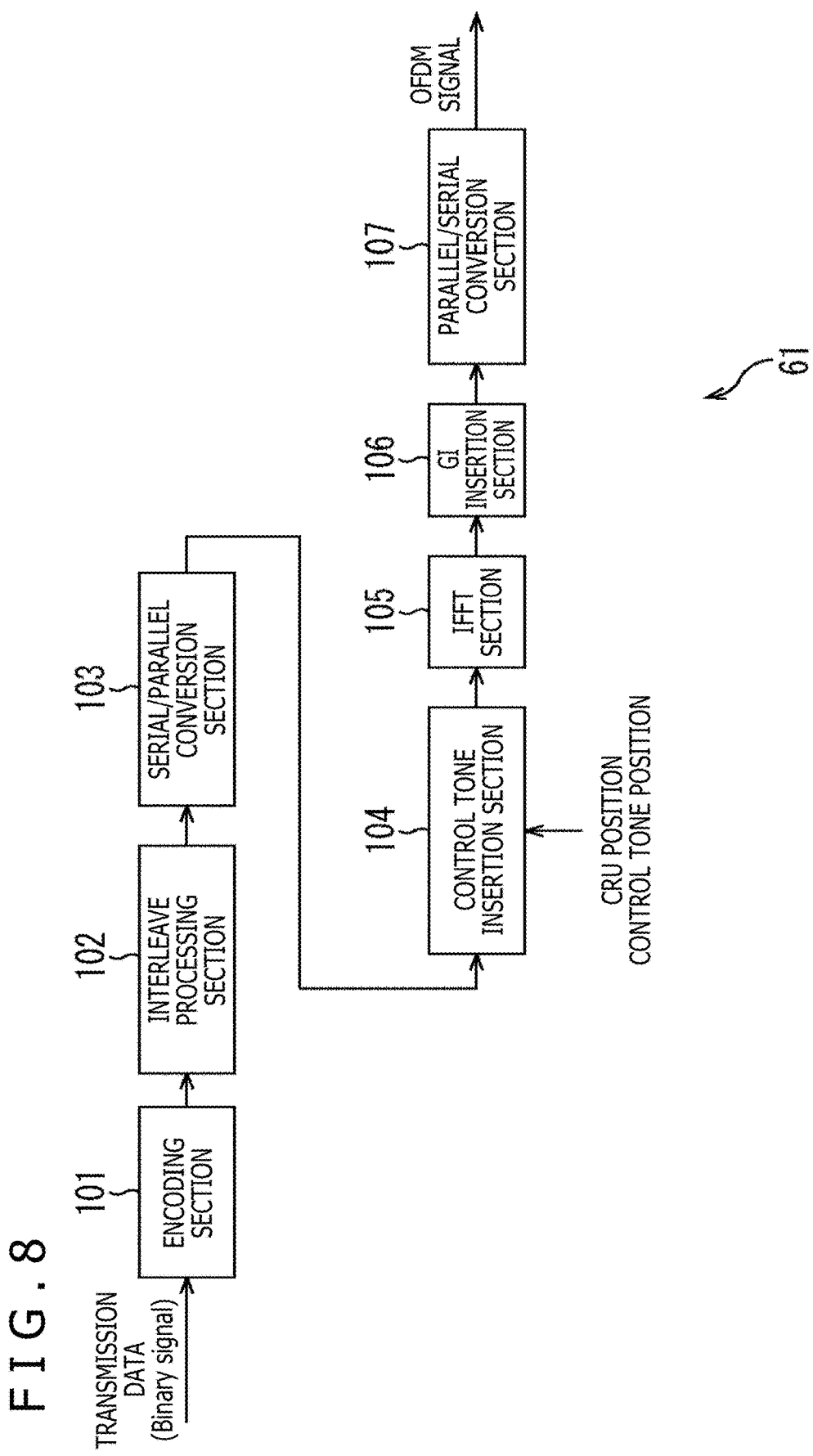
FIG. 8 is a block diagram depicting a detailed configuration example of an OFDM signal generation section of a transmission section.

FIG. 8 is a block diagram depicting the OFDM signal generation section 61 of the transmission section 43.

The OFDM signal generation section 61 includes an encoding section 101, an interleave processing section 102, a serial/parallel conversion section 103, a control tone insertion section 104, an IFFT section 105, a GI insertion section 106, and a parallel/serial conversion section 107.

The encoding section 101 encodes transmission data (a binary signal) supplied from the data processing section 41, by a predetermined encoding method such as convolutional coding or LDPC (Low Density Parity Check) coding, for example.

The interleave processing section 102 performs rearrangement of the order of data signals (interleaving) such as to produce discontinuous data sequence.

The serial/parallel conversion section 103 converts the serial transmission data supplied from the interleave processing section 102 into parallel data.

The control tone insertion section 104 inserts (sets) control tones and dummy tones in a CRU on the basis of a CRU position and control tone positions supplied from the control section 42. In addition, the control tone insertion section 104 also inserts (sets) reference tones which are pilot sub-carriers.

The IFFT section 105 performs inverse Fourier transform of sub-carriers supplied from the control tone insertion section 104, thereby converting the sub-carriers which have been arranged in a frequency region, into data signals on a time axis. The IFFT section 105 supplies the inverse Fourier-transformed signals to the GI insertion section 106.

The GI insertion section 106 inserts a guard interval in the signals supplied from the IFFT section 105 and supplies the resultant signals to the parallel/serial conversion section 107. The parallel/serial conversion section 107 generates an OFDM signal by re-converting the parallel signals supplied from the GI insertion section 106 into a serial signal and supplies the OFDM signal to the analog signal conversion section 62 (FIG. 7).

<5. Detailed Configuration Example of CRU Detection Section>

Figure 9:
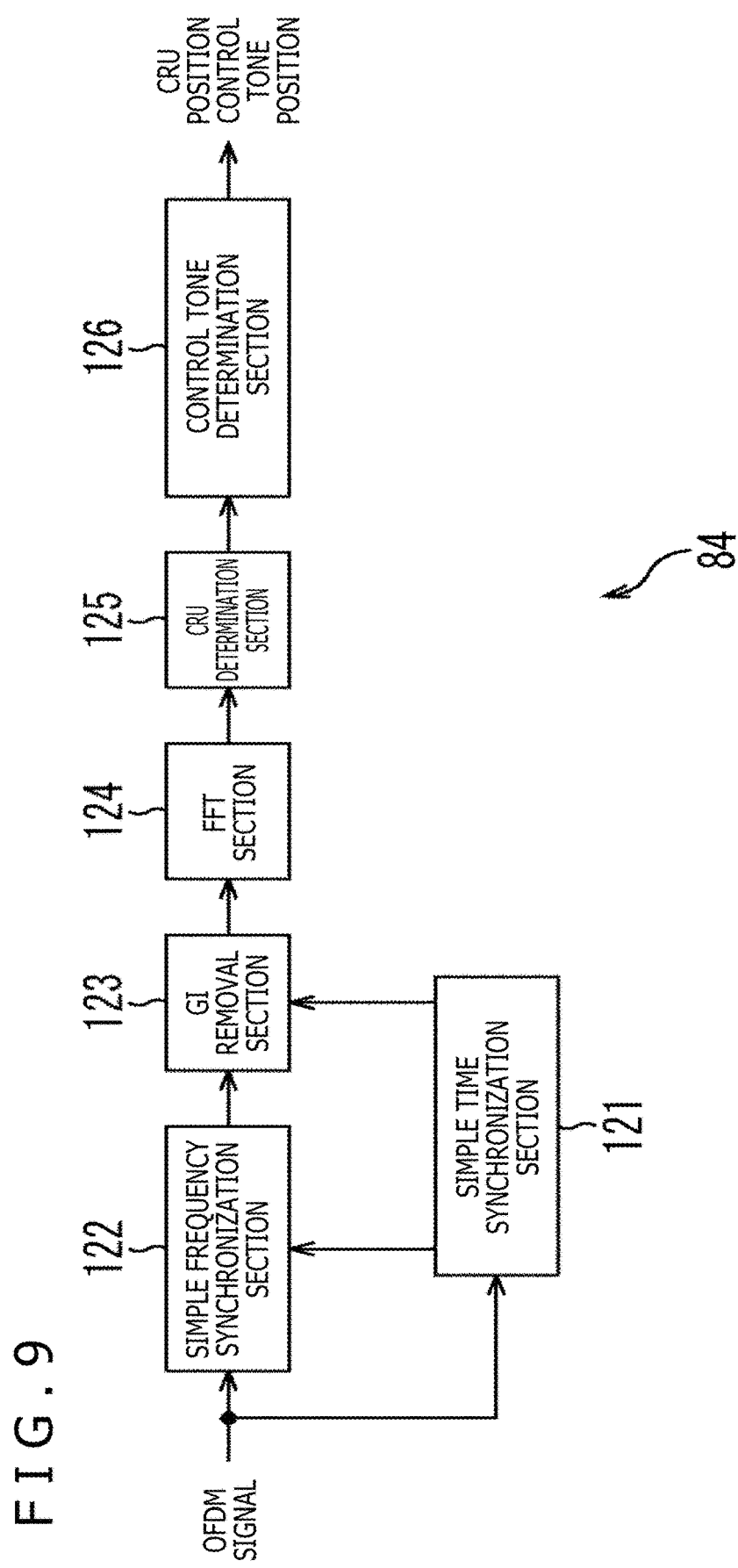
FIG. 9 is a block diagram depicting a detailed configuration example of a CRU detection section of a reception section.

FIG. 9 is a block diagram depicting a detailed configuration example of the CRU detection section 84 of the reception section 44.

The CRU detection section 84 includes a simple time synchronization section 121, a simple frequency synchronization section 122, a GI removal section 123, an FFT section 124, a CRU determination section 125, and a control tone determination section 126.

The simple time synchronization section 121 attains time synchronization in a simple manner by detecting a rough symbol timing in the OFDM signal supplied from the digital signal conversion section 82. The synchronization detection result obtained by the simple time synchronization section 121 is supplied to the simple frequency synchronization section 122 and the GI removal section 123. The simple frequency synchronization section 122 attains simple frequency synchronization on the basis of the symbol timing detected by the simple time synchronization section 121. By using the periodicity of the guard interval, the simple time synchronization section 121 and the simple frequency synchronization section 122 perform simple synchronization based on the autocorrelation of the received OFDM signal.

On the basis of the timing of the OFDM symbol detected by the simple time synchronization section 121, the GI removal section 123 removes the guard interval from the OFDM symbol and supplies the resultant OFDM symbol to the FFT section 124.

The FFT section 124 performs fast Fourier transform on the OFDM symbol from which the guard interval has been removed, thereby converting data signals on the time axis into sub-carriers that are arranged in the frequency region.

Regarding the multiple sub-carriers arranged in the frequency region, the CRU determination section 125 measures reception power of each of the respective RUs and detects a CRU. More specifically, the CRU determination section 125 calculates an average reception power value of each RU and determines, as a CRU, an RU the average reception power value of which is the lowest of those of the RUs. The determination result obtained by the CRU determination section 125 is supplied to the control tone determination section 126.

A CRU may be detected by a method other than the method of determining, as a CRU, an RU the average reception power value of which is the lowest of those of the RUs. For example, a CRU may be detected by calculating normalized power of each RU, which is obtained by normalizing the reception power of each RU with the total reception power of sub-carriers constituting all the RUs, and by comparing the normalized power of the respective RUs obtained by the above calculation.

The control tone determination section 126 determines the positions of sub-carriers that are set as control tones. More specifically, the control tone determination section 126 compares signal power of each of the sub-carriers in the RU determined as the CRU by the CRU determination section 125 with a threshold THw, thereby determining whether or not each of the sub-carriers in the CRU is a control tone or a dummy tone. As a result of this, the positions of sub-carriers determined as control tones are identified.

Alternatively, whether each of the sub-carriers in the CRU is a control tone or a dummy tone may be determined by making a comparison (relative value of signal power) with the power of a reference tone which is a sub-carrier necessarily having a power, instead of comparing the absolute value of the signal power of each sub-carrier with the threshold THw. Specifically, a sub-carrier that has, within a predetermined range, a difference from the power of a reference tone may be determined as a control tone, and a sub-carrier that has, beyond the predetermined range, a difference from the power of a reference tone may be determined as a dummy tone.

The control tone determination section 126 supplies the CRU position and the control tone positions, which are the CRU and control tone detection results (determination results), to the control section 42 (FIG. 7).

In the CRU detection section 84 having the abovementioned configuration, the simple time synchronization section 121 and the simple frequency synchronization section 122 each perform simple synchronization using the periodicity of a guard interval. In other words, synchronization at the CRU detection section 84 does not use a known pattern positioned on the head of a preamble signal. Accordingly, the preamble signal is not required. For this reason, although inferior in synchronization accuracy and convergence time to conventional OFDM signal demodulation sections, detection of an OFDM signal can be performed even from some midpoint of a packet. Further, since control information is obtained on the basis of power values of signals, demodulation of an OFDM signal is not required, and there is no need to perform advanced synchronization accuracy, channel estimation, phase correction, etc. which are necessary to improve a demodulation accuracy.

It is to be noted that any number can be taken as the number of OFDM symbols necessary to perform simple time synchronization and simple frequency synchronization and to make a determination on control tones. For example, simple time synchronization and simple frequency synchronization may be performed repeatedly for multiple symbols so that the synchronization accuracy is enhanced. Also, in order to make a determination on control tones correctly while taking the fluctuation of reception power (e.g., the fluctuation of the amplification value due to demodulation) into consideration, reception power of each of multiple symbols may be measured such that the peak value of the reception power is used for the determination.

Furthermore, the guard interval removing process and the fast Fourier transform process are also performed at the OFDM signal demodulation section 83. For this reason, the GI removal section 123 and the FFT section 124 may be realized on a circuit same as the OFDM signal demodulation section 83.

<6. OFDM Signal Transmitting Process>

Figure 10:
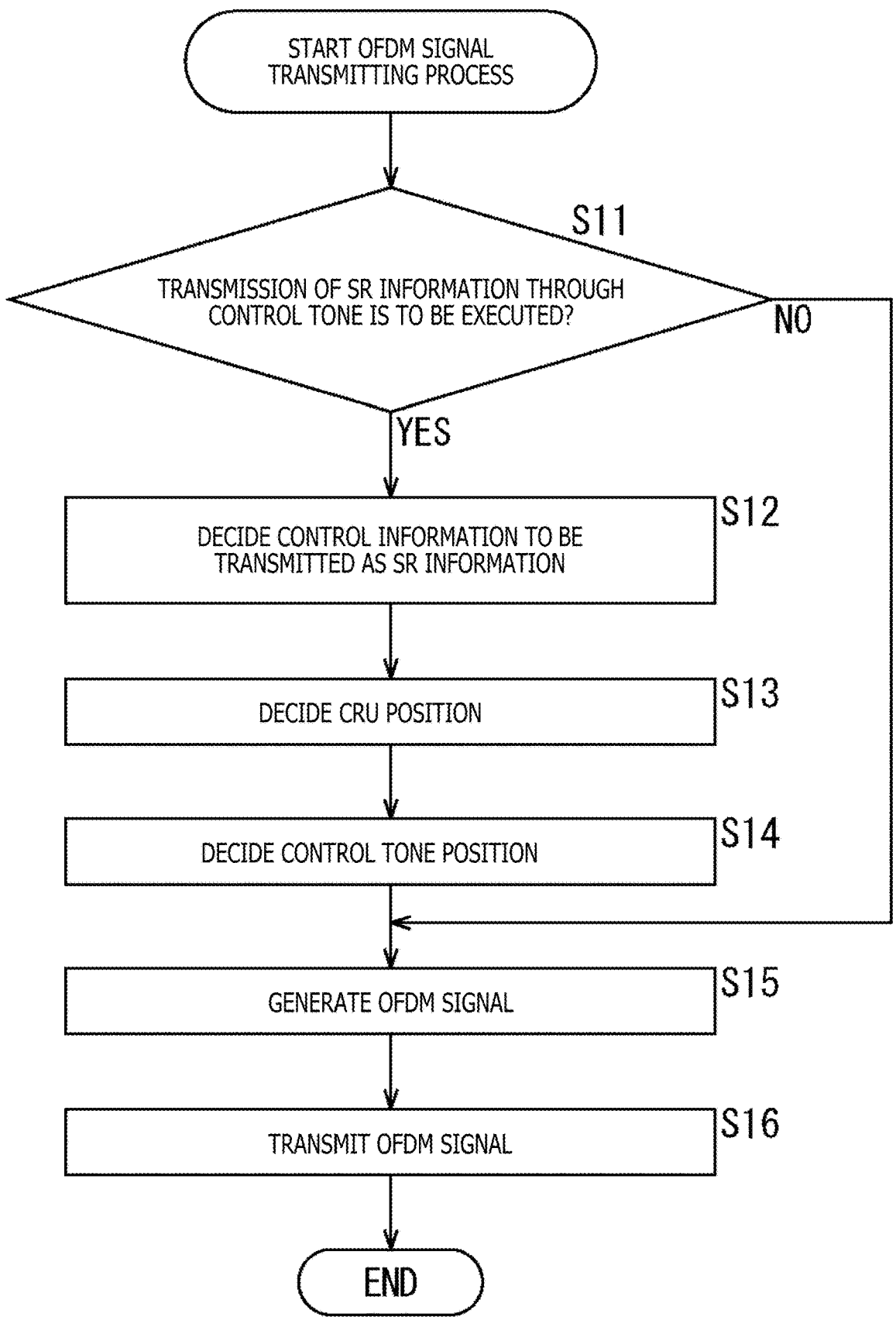
FIG. 10 is a flowchart for explaining an OFDM signal transmitting process.

Next, with reference to a flowchart in FIG. 10, an OFDM signal transmitting process at the wireless communication device 20 to transmit an OFDM signal will be explained.

First, in step S11, the control section 42 determines whether or not to transmit SR information through control tones. For example, the control section 42 can determine whether or not to transmit SR information through control tones, on the basis of a packet transmission success rate, an acquisition rate of preamble signals transmitted from OBSS, and the like. For example, in a case where the packet transmission success rate is low, the wireless communication device 20 determines that a preamble signal of a packet transmitted from the wireless communication device 20 is not acquired by a wireless communication device 20 belonging to a separate BSS and that a packet collision has occurred, and thus, decides to transmit SR information through control tones.

In a case where it is determined in step S11 not to transmit SR information through control tones, the process proceeds to step S15, which will be explained later.

In a case where it is determined in step S11 to transmit SR information through control tones, the process proceeds to step S12 in which the control section 42 decides one or more sets of control information to be transmitted as SR information.

In step S13, the control section 42 decides a CRU position, that is, the position of a RU to be set as a CRU. The details of deciding the CRU position will be explained later with reference to FIGS. 11 and 15, etc. For example, if, among plural RUs in a channel band, an RU that is being used as a CRU in a separate BSS is available, the available RU is selected as a CRU. Accordingly, the CRU is determined such that, when a CRU position is different, different BSSs are used.

In step S14, the control section 42 decides control tone positions in the CRU, that is, the sub-carrier positions at which control tones are set, on the basis of the one or more control information sets to be transmitted as SR information. More specifically, the control section 42 decides the control tone positions such that one predetermined sub-carrier corresponding to a control information set is set as a control tone having power. Accordingly, the number of sub-carriers, other than reference tones, to be set as control tones is equal to the number of control information sets to be transmitted through the CRU. Here, at least one of the control information sets to be transmitted as SR information is BSS identifier information. In a case where, in step S13 for deciding the CRU position, no RU is available among the multiple RUs in the channel band and an RU that is also being used in a separate BSS is selected as a CRU, the BSS is identified on the basis of the positions of plural sub-carriers allocated to the BSS identifier information.

The CRU position and the control tone positions decided in steps S13 and S14 are supplied to the OFDM signal generation section 61.

In step S15, the OFDM signal generation section 61 generates an OFDM signal on the basis of the transmission data supplied from the data processing section 41 and the CRU position and the control tone positions supplied from the control section 42 and supplies the OFDM signal to the analog signal conversion section 62. More specifically, the OFDM signal generation section 61 generates an OFDM signal in which, in a case where an RU which is used as a CRU in a separate BSS is available among plural RUs in the channel band, the available RU is set as a CRU, and, in a case where no RU is available, the position of a BSS identification sub-carrier which is a sub-carrier for identifying a BSS is set to be different from the position of a BSS identification sub-carrier in a separate BSS having the same CRU setting.

In step S16, the antenna sharing section 45 transmits the OFDM signal supplied via the analog signal conversion section 62 and the RF transmission section 63, to the antenna 46. That is, the OFDM signal generated by the OFDM signal generation section 61 is converted into an analog signal at the analog signal conversion section 62, frequency conversion (up-conversion) or power amplification is performed on the OFDM signal at the RF transmission section 63, and the resultant signal is emitted, as an electro-magnetic wave transmission signal, from the antenna 46 to the air.

In the manner described so far, the process of transmitting an OFDM signal is executed.

<7. Detailed Process of Determining CRU>

Figure 11:
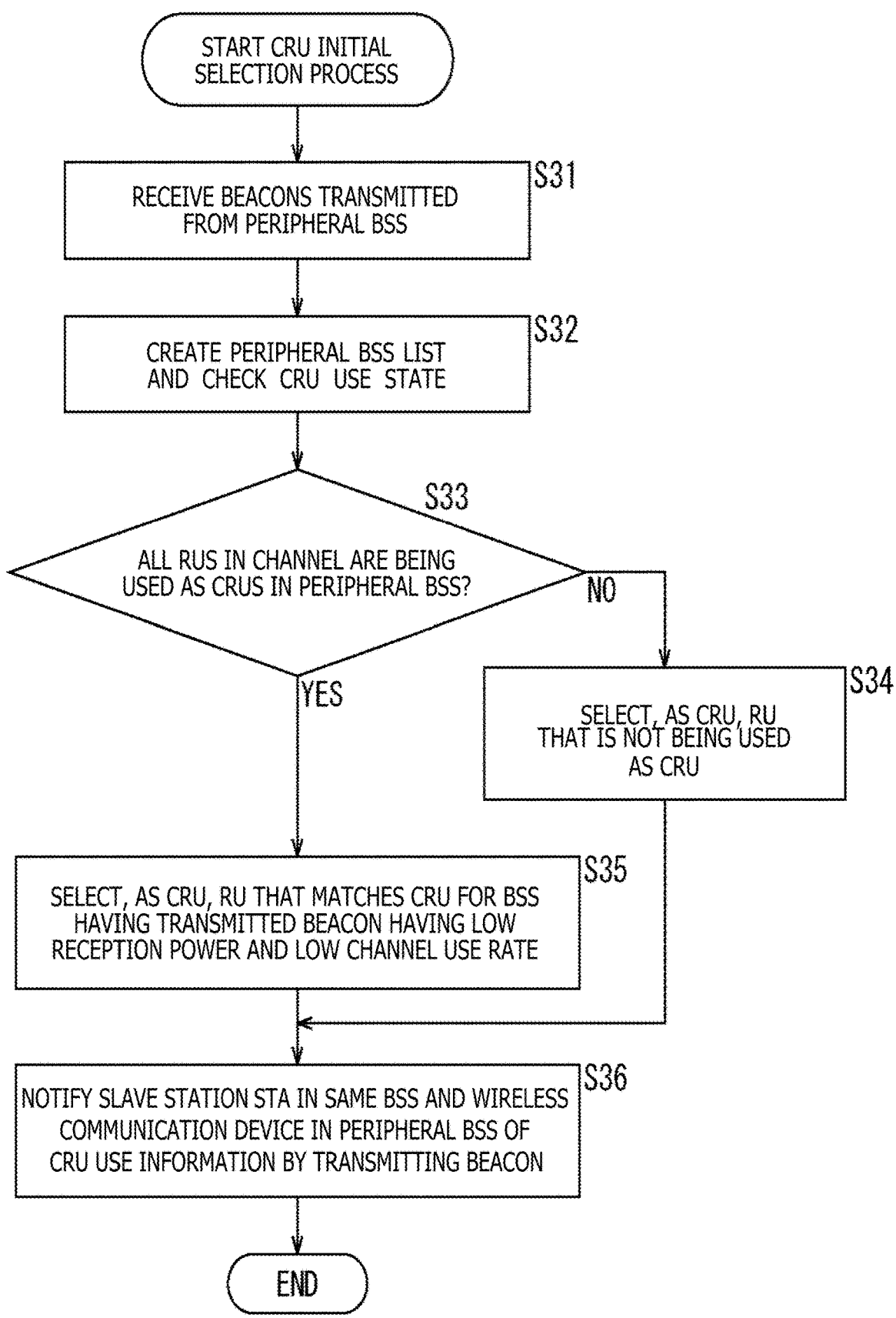
FIG. 11 is a flowchart for explaining a CRU initial selection process.

Next, a CRU initial selection process, which is executed to first decide a CRU, will be explained with reference to the flowchart of FIG. 11. This process may be executed as part of deciding the CRU position in step S13 of FIG. 10 or may be executed prior to step S13 of FIG. 10.

First, in step S31, the control section 42 performs control to receive beacons transmitted from one or more base station APs in peripheral BSSs. Accordingly, the beacons transmitted from the base stations AP in the peripheral BSSs are supplied to the reception section 44 via the antenna 46, demodulated, and then, supplied to the control section 42.

In step S32, the control section 42 creates a peripheral BSS list on the basis of the beacons transmitted from the one or more base stations AP in the peripheral BSSs and checks the respective CRU use states of the peripheral BSSs.

Figure 12:
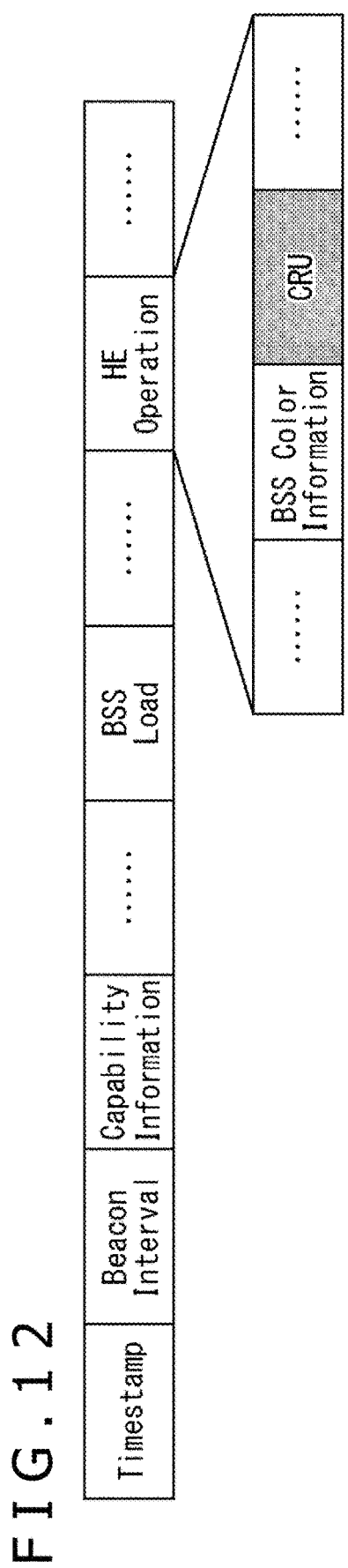
FIG. 12 is a diagram depicting a frame format example of a beacon.

FIG. 12 depicts a frame format example of a beacon transmitted from a base station AP in a peripheral BSS.

For example, the beacon includes a Timestamp field, a Beacon Interval field, a Capability Information field, a BSS Load field, and an HE Operation field.

The Timestamp field stores clock-time information which is used for synchronization between wireless communication devices 20.

The Beacon Interval field stores information regarding a beacon transmission period.

The Capability Information field stores various kinds of information regarding encryption, etc.

The BSS Load field stores information regarding the traffic volume or the channel use rate in a BSS.

The HE Operation field includes a BSS Color Information field and a CRU field, etc. The BSS Color Information field stores information regarding a BSS identifier, etc. The CRU field stores information regarding a CRU and control tones which are used to identify a BSS.

Figure 13:
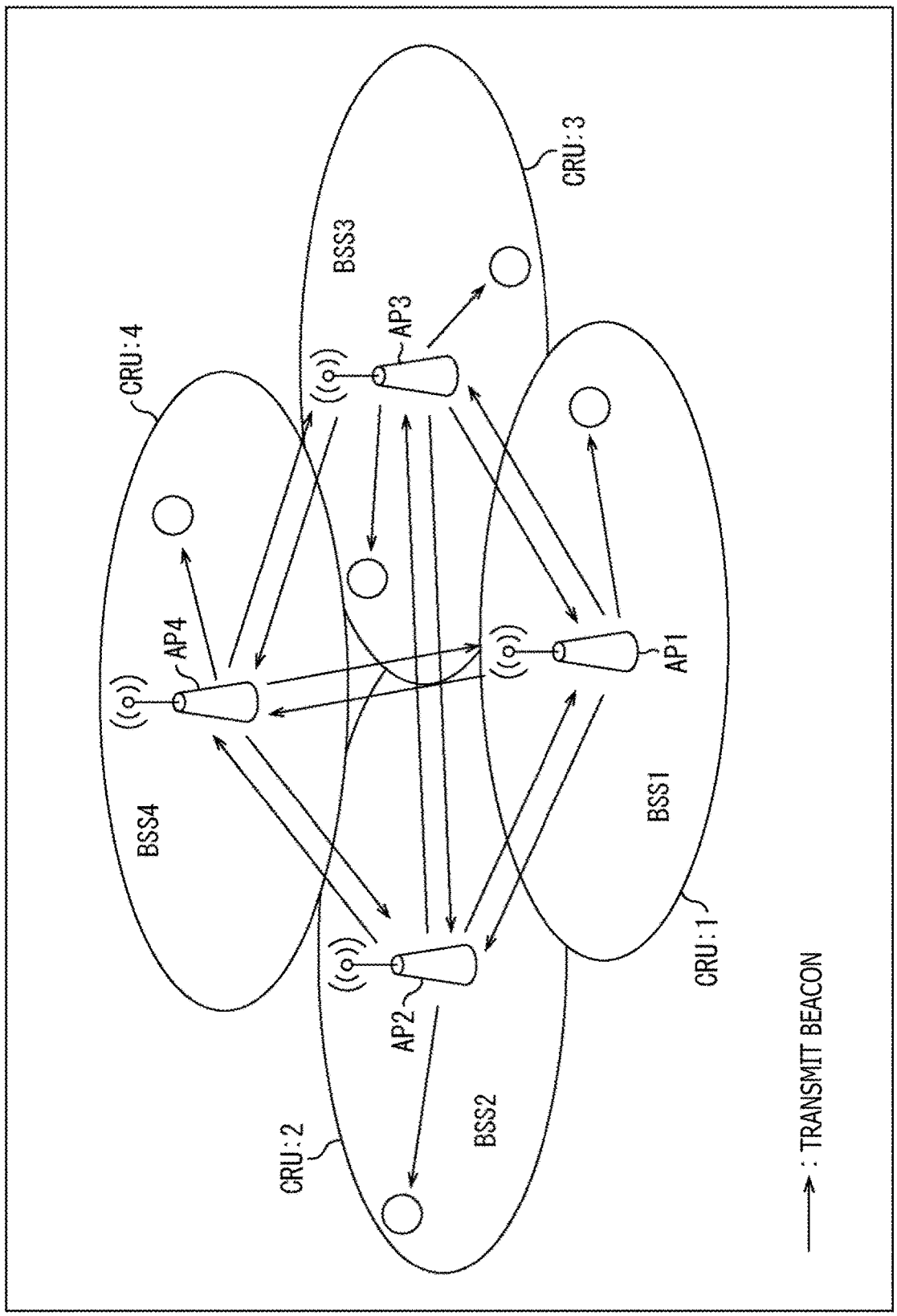
FIG. 13 is a diagram for explaining creation of a peripheral BSS list.

Here, it is assumed, for example, that four BSSs 1 to 4 are in a positional relation to interfere with one another and that base stations AP1 to AP4 of the respective BSSs are transmitting beacons, as depicted in FIG. 13. The BSS1 to BSS4 use 1 to 4 (RU1 to RU4) as CRUs, respectively.

Under such a situation, the base station AP1 belonging to the BSS1, for example, receives beacons transmitted from one or more of the peripheral base stations AP, thereby creating a peripheral BSS list depicted in FIG. 14.

That is, FIG. 14 depicts an example of a peripheral BSS list which is created by the base station AP1 under the situation in FIG. 13.

The peripheral BSS list includes such items as BSS identifier, reception power, CH use rate (channel use rate), and CRU.

The BSS identifier item includes information acquired from the BSS Color Information field of the beacon.

The reception power item includes a measured value of reception power at the time of reception of the beacon.

The CH use rate item includes information acquired from the BSS Load field of the beacon.

The CRU item includes information regarding a CRU (used CRU) and control tones acquired from the CRU field of the beacon.

By creating the peripheral BSS list depicted in FIG. 14, the base station AP1 can recognize which RU is used as a CRU in each of the peripheral BSSs.

Referring back to FIG. 11, step S32 in which the peripheral BSS list is created is followed by step S33 in which the control section 42 determines, on the basis of the created peripheral BSS list, whether or not all the RUs in the channel are used as CRUs in the peripheral BSSs.

In a case where it is determined in step S33 that not all the RUs in the channel are used as CRUs in the peripheral BSSs, the process proceeds to step S34 in which the control section 42 selects, as a CRU, an RU that is not being used as a CRU in the peripheral BSSs. Accordingly, in a case where the CRU position is different, different BSSs are used. After step S34, the process proceeds to step S36.

In a case where it is determined in step S33 that all the RUs in the channel are used as CRUs in the peripheral BSSs, the process proceeds to step S35 in which the control section 42 selects, as a CRU, an RU that matches the CRU for a BSS having transmitted a beacon having low reception power and a low channel use rate. Then, the process proceeds to step S36.

In step S36, the control section 42 performs control to transmit beacons and notifies the slave station STA in the same BSS and the wireless communication devices 20 in the peripheral BSSs of the CRU usage information.

In the abovementioned manner, in the case of determining a CRU, in a case where the RUs in the channel include an available RU (that is not used as a CRU in the peripheral BSSs), the control section 42 selects the available RU as a CRU, and in a case where none of the RUs are available, the control section 42 selects, as a CRU, an RU that matches a CRU for a BSS having transmitted a beacon having a low reception power and a low channel use rate.

Meanwhile, since the peripheral environment changes with time, a CRU needs to be properly re-selected according to the change of the peripheral environment change. For example, in a case where a packet re-transmission rate in spatial reuse is high, CRUs that are being used are identified on the basis of beacons and preamble signals in packets transmitted from peripheral BSSs. In a case where the CRUs match, whether or not the corresponding beacon or signal has been transmitted from a neighboring BSS is determined on the basis of the reception power. In a case where there is a CRU overlap with a neighboring BSS, an RU that has low reception power and a low channel use rate is re-selected as a CRU on the basis of the peripheral BSS list.

Figure 15:
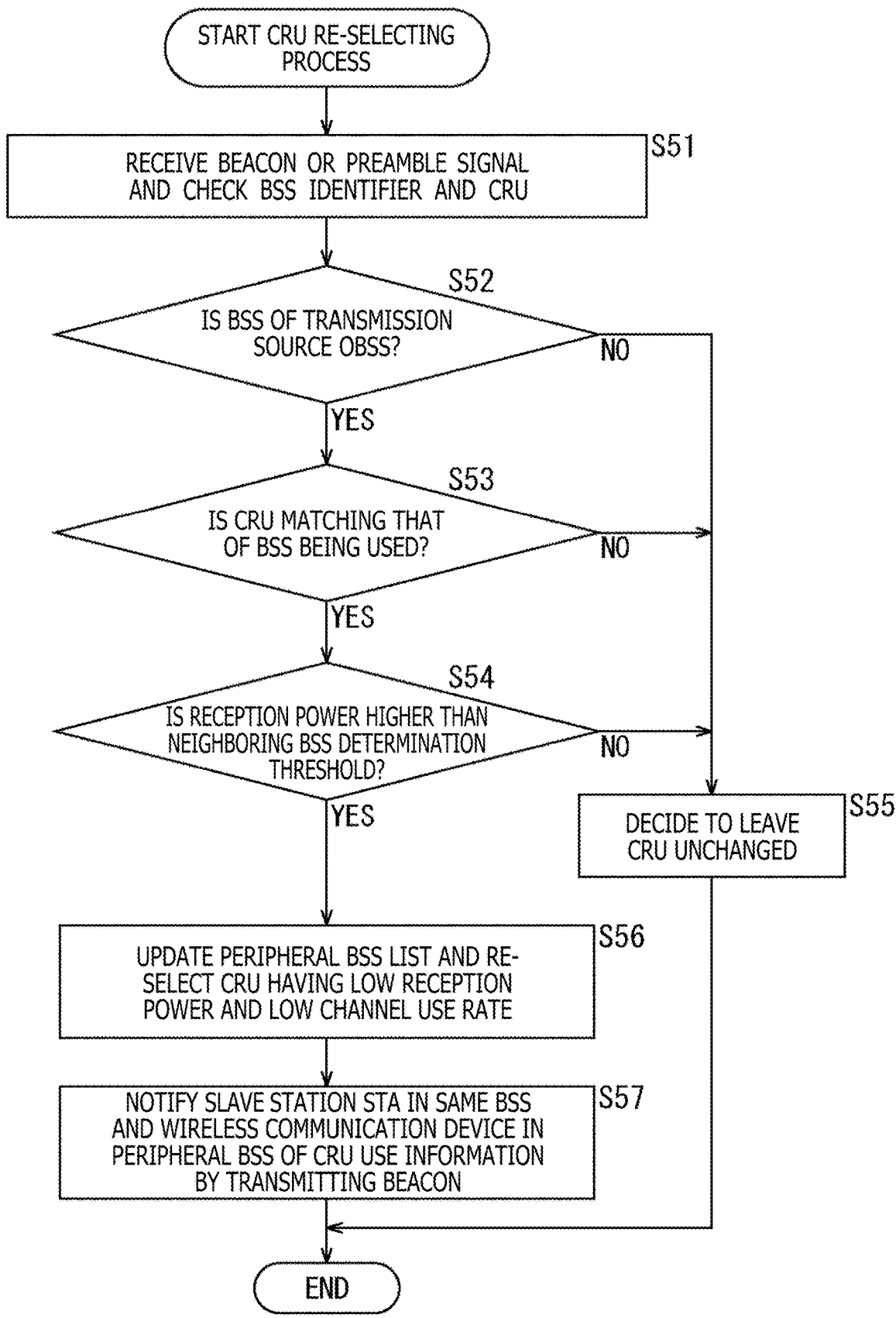
FIG. 15 is a flowchart for explaining a CRU re-selecting process.

FIG. 15 is a flowchart for explaining a CRU re-selecting process of properly re-selecting a CRU according to a change in the peripheral environment after once determining a CRU. This process may be executed as part of deciding the CRU position in step S13 of FIG. 10 or may be executed prior to step S13 of FIG. 10.

First, in step S51, the control section 42 performs control to receive a beacon or a preamble signal transmitted from a separate base station AP and checks a BSS identifier and a CRU.

FIG. 16 is a format example of a preamble signal in HE-SIG-A (HE SU PPDU).

The preamble signal includes a Format field, a Beam Change field, a UL/DL field, an MCS field, a DCM field, a BSS Color field, and a CRU field.

The Format field stores information for distinguishing between HE SU PPDU and HE ER SU PPDU.

The Beam Change field stores information regarding the presence/absence of a spatial mapping-related change in the preamble signal.

The UL/DL field stores information indicating which of UL communication or DL communication is used to transmit PPDU.

The MCS field stores information regarding an MCS (Modulation and Coding Scheme) to be used.

The DCM field stores information regarding whether or not to apply DCM (Dual Carrier Modulation).

The BSS Color field stores information such as a BSS identifier to identify a BSS.

The CRU field stores information regarding a CRU and control tones which are used to identify a BSS.

Therefore, when the preamble signal is received, a BSS and a CRU that are being used by a base station AP having transmitted the preamble signal can be identified. As explained previously with reference to FIG. 12, when a beacon is received, a BSS of a transmission source and a CRU can be identified.

In step S52 in FIG. 15, the control section 42 determines whether or not a BSS of the transmission source of the beacon or the preamble signal is an OBSS which is a separate BSS.

In a case where it is determined in step S52 that the BSS of the transmission source is not an OBSS, the process proceeds to step S55 described below.

On the other hand, in a case where it is determined in step S52 that the BSS of the transmission source is an OBSS, the process proceeds to step S53 in which whether or not a CRU that matches the CRU in the own BSS is being used by the base station AP of the transmission source is determined.

In a case where it is determined in step S53 that the base station AP of the transmission source is not using a CRU matching that in the own BSS, the process proceeds to step S55, which will be explained later.

On the other hand, in a case where it is determined in step S53 that the base station AP of the transmission source is using a CRU matching that in the own BSS, the process proceeds to step S54 in which whether or not signal power (reception power) of the received beacon or the received preamble signal is higher than a neighboring BSS determination threshold is determined. The neighboring BSS determination threshold is a power value for determining whether or not the BSS of the transmission source is located at a near position.

In a case where it is determined in step S54 that the reception power is lower than the neighboring BSS determination threshold, the process proceeds to step S55. Then, in step S55, the control section 42 decides to leave the currently used CRU unchanged. Then, the CRU re-selecting process is ended.

On the other hand, in a case where it is determined in step S54 that the reception power of the transmission source is higher than the neighboring BSS determination threshold, the process proceeds to step S56 in which the control section 42 updates the peripheral BSS list and selects (re-selects), as the CRU, a CRU having low reception power and a low channel use rate. Then, the process proceeds to step S57.

In step S57, the control section 42 performs control to transmit a beacon and notifies the slave stations STA in the same BSS and the wireless communication devices 20 in the peripheral BSSs of the CRU use information. Then, the CRU re-selecting process is ended.

In the abovementioned manner, a CRU can be properly re-selected according to a change in the peripheral environment.

<8. OFDM Signal Receiving Process>

Next, a process which is executed at a reception side to receive the abovementioned OFDM signal including a CRU will be explained.

First, a first OFDM signal receiving process will be explained with reference to the flowchart of FIG. 17. The first OFDM signal receiving process corresponds to a receiving process which is executed in a case where a preamble signal can be detected from reception signals, as depicted in FIG. 2. This process is started in a case where, for example, the control section 42 performs control to start signal detection.

First, in step S71, the antenna sharing section 45 and the reception section 44 start signal detection.

In step S72, the OFDM signal demodulation section 83 determines whether or not a preamble signal has been detected from among reception signals inputted through the RF reception section 81 and the digital signal conversion section 82. Step S72 is repeated until detection of a preamble signal is determined.

Then, in a case where it is determined in step S72 that a preamble signal has been detected, the process proceeds to step S73 in which the OFDM signal demodulation section 83 determines whether or not the reception power of the reception signal is equal to or greater than a predetermined threshold that is decided in advance.

In a case where it is determined in step S73 that the reception power of the reception signal is less than the predetermined threshold, the process returns to step S72. Then, steps S72 and S73 are repeated.

On the other hand, in a case where it is determined in step S73 that the reception power of the reception signal is equal to or greater than the predetermined threshold, the process proceeds to step S74 in which the OFDM signal demodulation section 83 demodulates the received OFDM signal. One or more sets of control information as SR information obtained as a result of the demodulation are supplied to the control section 42.

As explained so far, in a case where a preamble signal is successfully detected, SR information included in the preamble signal can be acquired, as depicted in FIG. 2.

Next, a second OFDM signal receiving process will be explained with reference to the flowchart of FIG. 18. The second OFDM signal receiving process corresponds to a receiving process that is executed in a case where a preamble signal cannot be detected from reception signals, as depicted in FIG. 4. This process is started, for example, in a case where the control section 42 performs control to start signal detection.

First, in step S91, the antenna sharing section 45 and the reception section 44 start signal detection.

In step S92, the CRU detection section 84 determines whether or not an OFDM signal has been detected from reception signals inputted via the RF reception section 81 and the digital signal conversion section 82. Step S92 is repeated until detection of an OFDM signal is determined. Detection of an OFDM signal in step S92 refers to detection of an OFDM symbol timing based on an autocorrelation using the periodicity of a guard interval at the simple time synchronization section 121 and the simple frequency synchronization section 122.

In a case where it is determined in step S92 that an OFDM signal has been detected, the process proceeds to step S93 in which the CRU detection section 84 determines whether or not the reception power of the reception signal is equal to or greater than a predetermined threshold that is decided in advance. This threshold may be identical to the threshold used in step S73 of FIG. 17 or may be different from the threshold.

In a case where it is determined in step S93 that the reception power of the reception signal is less than the predetermined threshold, the process proceeds to step S92. Then, step S92 and S93 are repeated.

On the other hand, in a case where it is determined in step S93 that the reception power of the reception signal is equal to or higher than the predetermined threshold, the process proceeds to step S94 in which the CRU detection section 84 determines a CRU. More specifically, the CRU determination section 125 of the CRU detection section 84 calculates an average reception power value of each RU and determines that an RU that has the lowest average reception power value among the RUs is a CRU.

After step S94, the process proceeds to step S95 in which the CRU detection section 84 determines control tones in the CRU. More specifically, the control tone determination section 126 of the CRU detection section 84 compares, with the threshold THw, the signal power of each sub-carrier in the RU determined as the CRU by the CRU determination section 125, thereby determining whether each sub-carrier in the CRU is a control tone or a dummy tone. It is to be noted that whether each sub-carrier is a control tone or a dummy tone may be determined by a relative comparison with power of a reference tone, as previously explained.

In step S96, the CRU detection section 84 determines whether or not acquisition of SR information has been performed successfully. Specifically, the CRU detection section 84 determines a parity bit indicated by the control tone positions in the CRU and whether or not the number of detected control tones is equal to the number of control information sets defined in advance, whereby whether SR information has been acquired successfully is determined.

In a case where a determination of failure of acquisition of SR information is made in step S96, the process proceeds to step S97 in which the CRU detection section 84 notifies the control section 42 of the failure of acquisition of SR information.

On the other hand, in a case where it is determined in step S96 that SR information has been acquired successfully, the process proceeds to step S98 in which the CRU detection section 84 supplies the CRU position determined in step S94 and the control tone positions determined in step S95 to the control section 42. Then, the second OFDM signal receiving process is ended. The control section 42 can acquire SR information on the basis of the CRU position and the control tone positions supplied from the CRU detection section 84.

Figure 17:
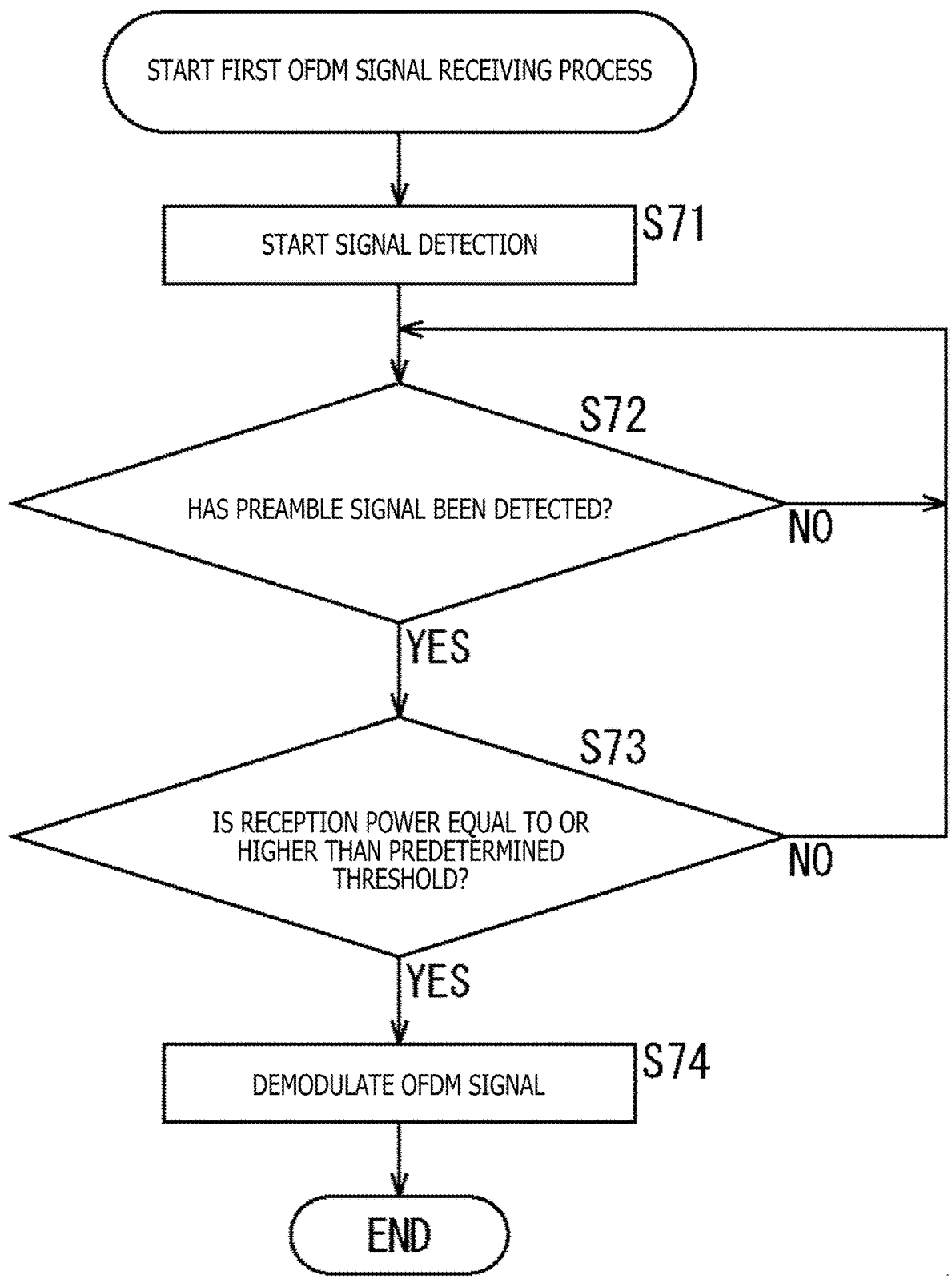
FIG. 17 is a flowchart for explaining a first OFDM signal receiving process.
Figure 18:
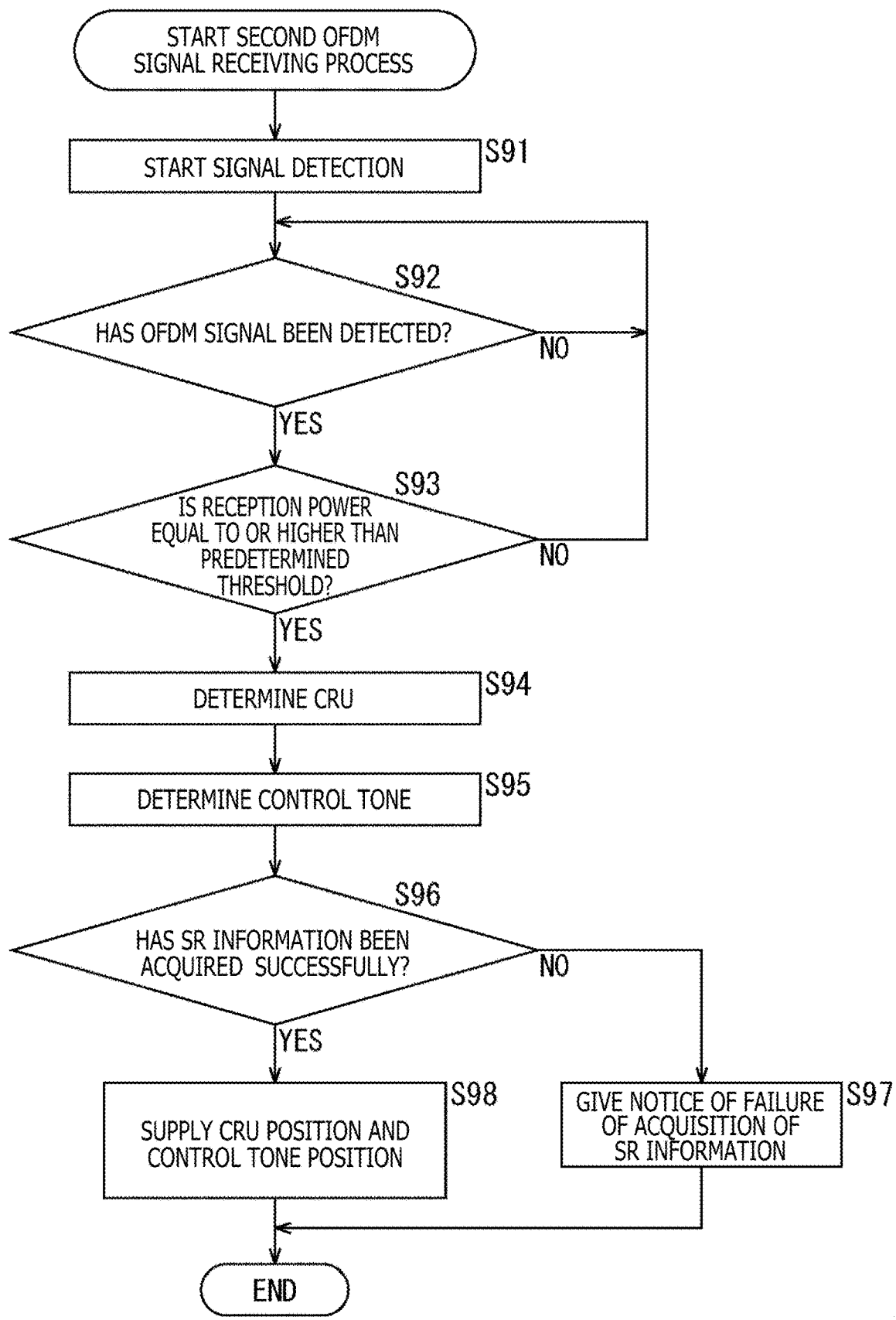
FIG. 18 is a flowchart for explaining a second OFDM signal receiving process.

It is to be noted that the first OFDM signal receiving process in FIG. 17 and the second OFDM signal receiving process in FIG. 18 have been explained as different processes, for convenience of explanation, but these processes can be executed parallelly and simultaneously. In a case where a preamble signal has been detected from reception signals, SR information is supplied from the OFDM signal demodulation section 83 to the control section 42. In a case where a preamble signal cannot be detected, SR information is supplied from the CRU determination section 125 to the control section 42.

Figure 19:
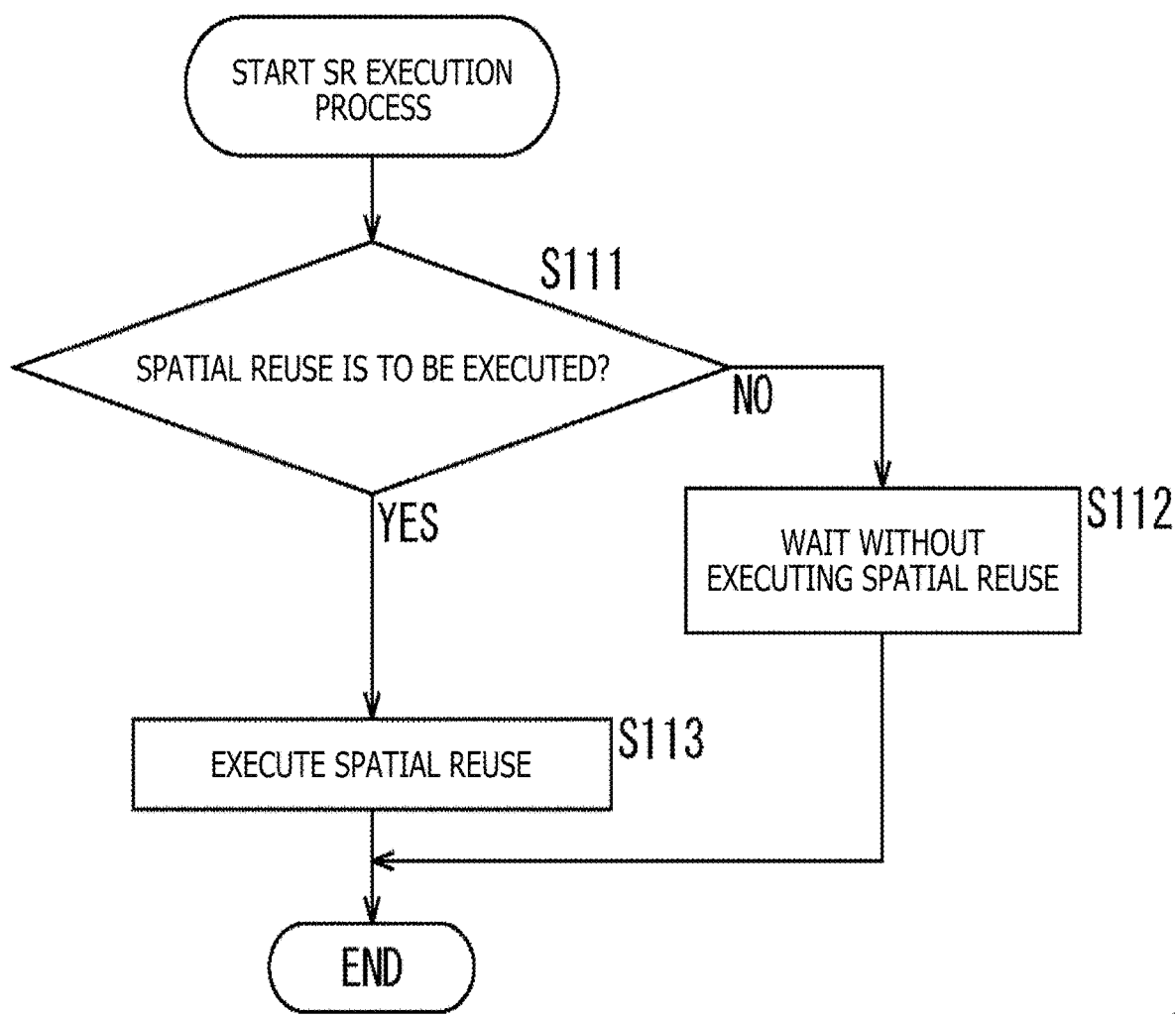
FIG. 19 is a flowchart for explaining an SR execution process.

Next, an SR execution process which is executed by the control section 42 will be explained with reference to the flowchart of FIG. 19.

First, in step S111, the control section 42 acquires SR information supplied from the OFDM signal demodulation section 83 as a result of the first OFDM signal receiving process or SR information supplied from the CRU detection section 84 as a result of the second OFDM signal receiving process, and determines whether or not to execute spatial reuse (SR), on the basis of the acquired SR information.

In a case where a determination not to execute spatial reuse is made in step S111, the process proceeds to step S112 in which the control section 42 does not execute a spatial reuse and enters a standby state.

On the other hand, in a case where a determination to execute spatial reuse is made in step S111, the process proceeds to step S113 in which the control section 42 executes spatial reuse. Specifically, the control section 42 calculates, from the reception power of the packet or the SR information, a transmission parameter such as transmission power or transmission time that does not hinder packet transmission from an adjacent separate BSS, and starts packet transmission by using the set transmission parameter during the packet transmission from the separate base station AP.

Consequently, the SR execution process is ended. As explained so far, the control section 42 executes the SR execution process to decide, on the basis of received SR information, whether or not to perform transmission (SR transmission) using spatial reuse (SR).

A reception-side wireless communication device 20 that receives an OFDM signal including a CRU first identifies the CRU having minimum power among RUs and carries out two-stage determination including a rough BSS determination and a following detailed BSS determination according to control tones at sub-carrier positions $b_4$ to $b_9$, so that whether or not the reception-side BSS is identical to the transmission-side one can be recognized.

A BSS identifier is a numerical value of approximately 6 bits. If 64, which is the sixth power of 2, is adopted as a BSS identifier, 1 RU is insufficient so that a band for data transmission is reduced to deteriorate the transmission efficiency. It is sufficient that a BSS identifier is used to determine the value coincidence. Therefore, as previously explained, BSS identifiers are allocated by units of RU instead of units of sub-carrier, and then, the abovementioned two-stage determination is made. Accordingly, unnecessary use of sub-carriers can be avoided, and the amount of SR information which can be transmitted by a band that corresponds to 1 RU can be increased.

Also, the number of control tones in a CRU is adjusted to be equal to the number of control information sets to be transmitted as SR information, whereby whether or not the SR information is properly received can be determined.

<9. Specific Example of Executing SR>

According to the wireless communication system 1 of FIG. 1, an OFDM signal in which a predetermined one of plural RUs in a channel is set as a CRU for transmitting SR information is transmitted. Accordingly, the SR information can be acquired even from some midpoint of a packet when reception of a preamble signal of the packet is missed, as previously explained with reference to FIG. 4. Then, spatial reuse (SR) can be executed on the basis of the SR information acquired from the midpoint of the packet.

As a specific spatial reuse example, an example of deciding transmission power on the basis of information regarding transmission power acquired from SR information will be explained with reference to FIGS. 20 and 21.

Figure 20:
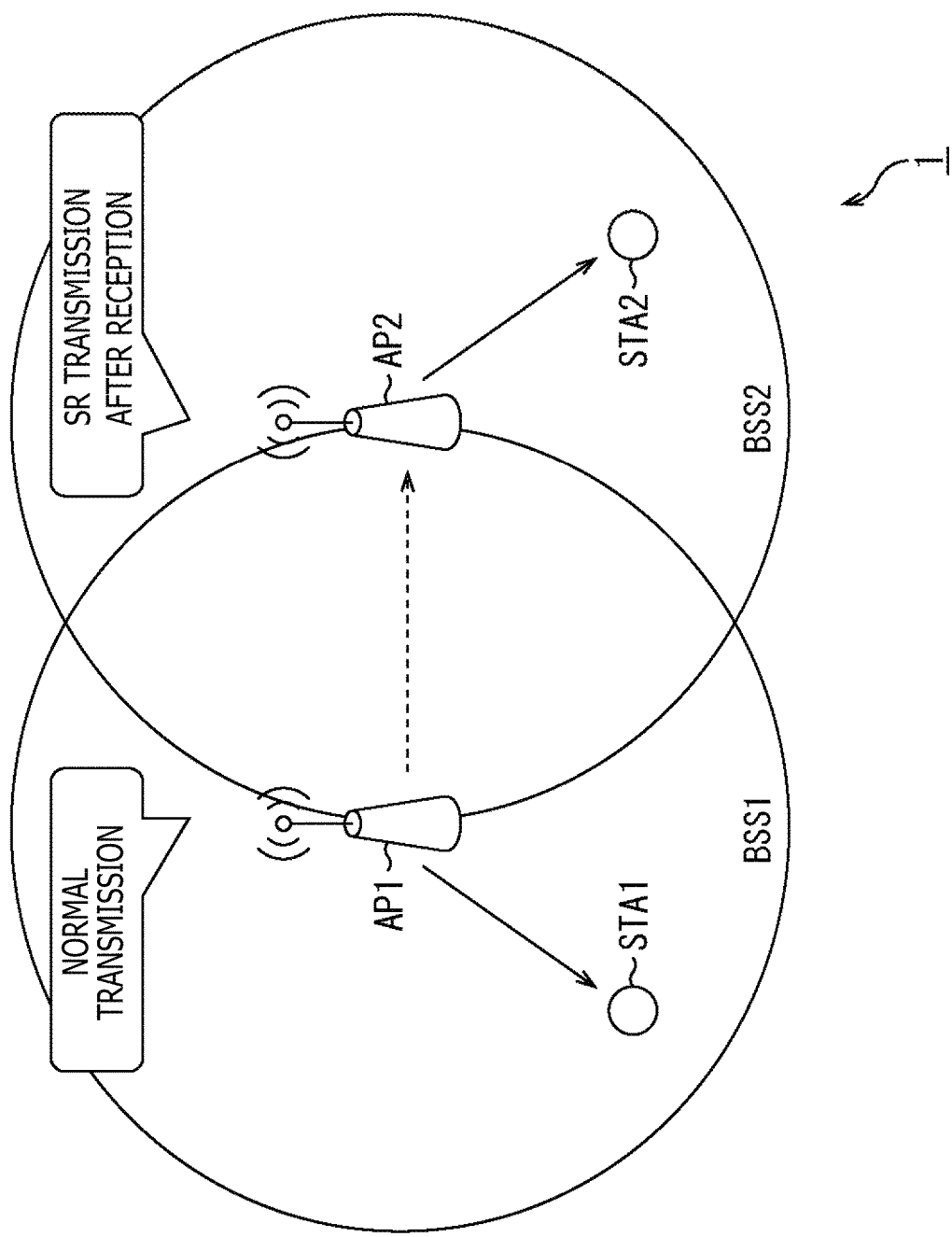
FIG. 20 is a diagram for explaining an example of executing SR.

Specifically, an explanation will be given of an example in which a base station AP1 transmits an OFDM signal in which one of RUs in a channel is set as a CRU, a base station AP2 receives the OFDM signal from the base station AP1, and transmission (SR transmission) using spatial reuse (SR) is performed, as depicted in FIG. 20.

For easy understanding of explanation, transmission power or reception power will be explained by use of specific numerical value examples, with reference to FIG. 21.

Regarding a threshold OBSSPD that is used by the base station AP2 to detect a preamble signal from the base station AP1 of an OBSS, it is a prerequisite that a lower threshold $OBSSPD_{Min}$=−82 dBm and an upper threshold $OBSSPD_{Max}$=−62 dBm.

Therefore, in a case where reception power RxPow from the base station AP1 of the OBSS falls within the range from −82 to −62 dBm, the base station AP2 executes SR transmission. It is to be noted that a reference transmission power value $TxPow_{Ref}$ is assumed to be 23 dBm.

The base station AP2 first calculates SR transmission power $TxPow_{SR}$ that does not depend on the transmission power $TxPow_{OBSS}$ of the base station AP1 of the OBSS according to the following expression (1):

$$TxPow_{SR}=TxPow_{Ref}-(RxPow-OBSSPD_{Min}) \quad (1)$$

Expression (1) expresses that a value obtained by subtracting, from the reference transmission power value $TxPow_{Ref}$, a dBm value that is equal to the difference between the reception power RxPow from the base station AP1 and the lower threshold $OBSSPD_{Min}$ is selected as the SR transmission power $TxPow_{SR}$ that does not depend on the OBSS transmission power.

Figure 21:
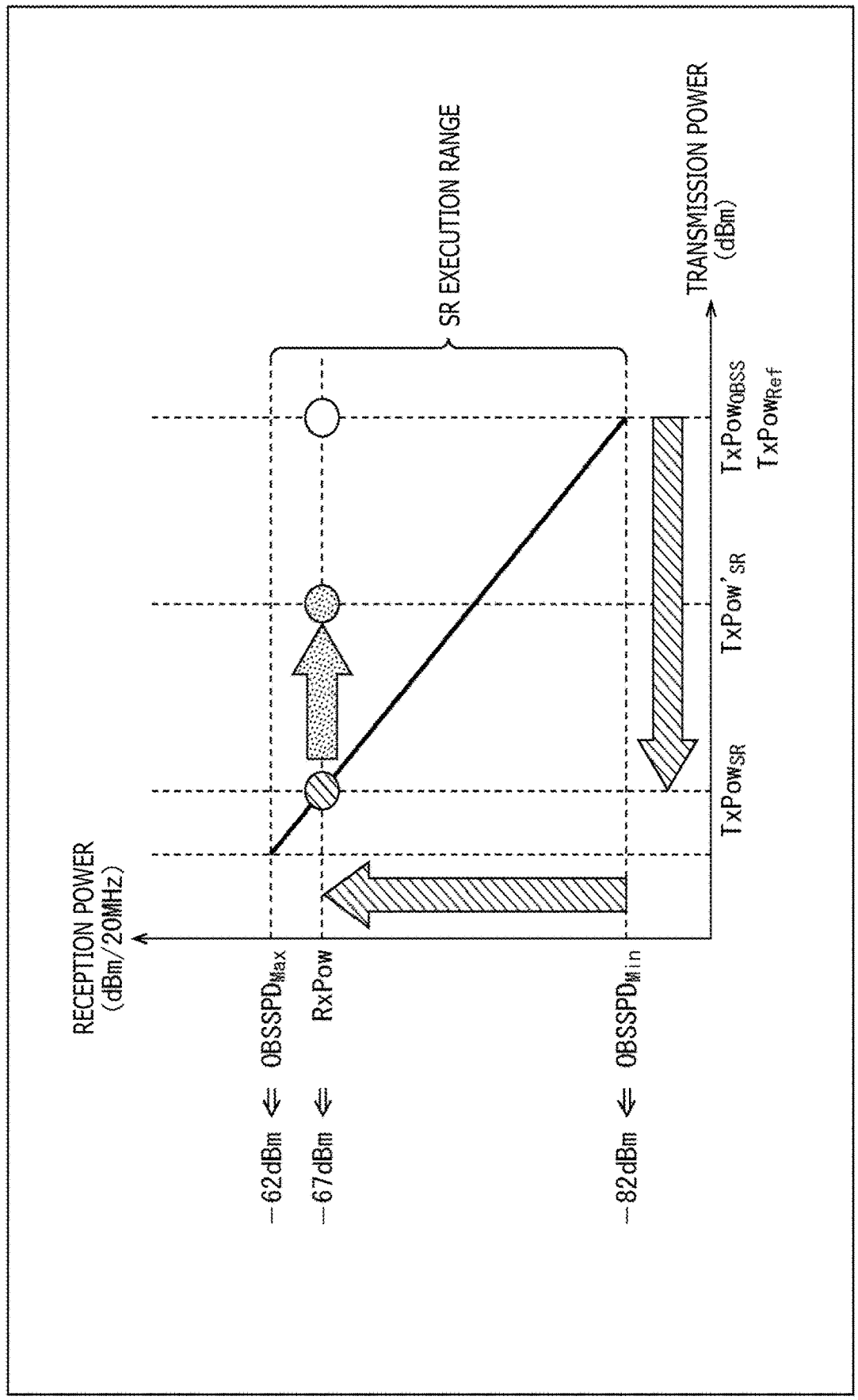
FIG. 21 is a diagram for explaining an example of executing SR.

For example, when the reception power RxPow from the base station AP1 is −67 dBm, as depicted in FIG. 21, the difference between the reception power RxPow and the lower threshold $OBSSPD_{Min}$ is $RxPow-OBSSPD_{Min}$=−67−(−82)=15 dBm. Thus, according to expression (1), the SR transmission power is obtained by $$TxPow_{SR}=TxPow_{Ref}-(RxPow-OBSSPD_{Min})=23-15=8 \text{ dBm.}$$

Next, the SR transmission power $TxPow_{SR}$ that does not depend on the OBSS transmission power, which is obtained from expression (1), and transmission power $TxPow_{OBSS}$ of the base station AP1 of the OBSS acquired as SR information are used to calculate SR transmission power $Tx\_Pow'_{SR}$ that depends on the OBSS transmission power, according to the following expression (2).

[Math. 1]

$$TxPow'_{SR} = \frac{TxPow_{SR} + TxPow_{OBSS}}{2} \quad (2)$$

Expression (2) expresses that an average value of the SR transmission power $TxPow_{SR}$ that does not depend on the OBSS transmission power and the transmission power $TxPow_{OBSS}$ of the base station AP1 of the OBSS is defined as the SR transmission power $Tx\_Pow'_{SR}$ that depends on the OBSS transmission power.

In the example in FIG. 21, if the transmission power $TxPow_{OBSS}$ of the base station AP1 of the OBSS is 23 dBm which is equal to the reference transmission power value $TxPow_{Ref}$, the SR transmission power $Tx\_Pow'_{SR}$ that depends on the OBSS transmission power is 15.5 dBm, as follows.

$$Tx\_Pow'_{SR}=(TxPow_{SR}+TxPow_{OBSS})/2=(8+23)/2=15.5 \text{ dBm}$$

Consequently, on the basis of information regarding the transmission power acquired from the SR information, the base station AP2 increases the transmission power to transmission power that is higher than the SR transmission power $TxPow_{SR}=8$ dBm that does not depend on the OBSS transmission power. Then, the base station AP2 performs transmission (SR transmission) using spatial reuse.

It is to be noted that, since the transmission power of the base station AP1 in the OBSS is lowered during SR transmission in some cases, the transmission power $TxPow_{OBSS}$ of the base station AP1 of the OBSS is not necessarily equal to the reference transmission power value $TxPow_{Ref}$.

In the abovementioned manner, the control section 42 of the base station AP2 can decide transmission power of SR transmission on the basis of information regarding the transmission power of the base station AP1 acquired from the SR information. It is to be noted that the transmission power may be decided by any other method, or control information (e.g., duration information) other than OBSS transmission power information may be acquired, to adjust any other parameter such as transmission time.

<10. Configuration Example of Computer>

The abovementioned processing series can be executed by hardware and also by software. In a case where the processing series is executed by software, a program constituting the software is installed into a computer. Examples of this computer include a microcomputer that is incorporated in dedicated-hardware and a general-purpose computer into which various programs are installed such that various functions can be implemented.

Figure 22:
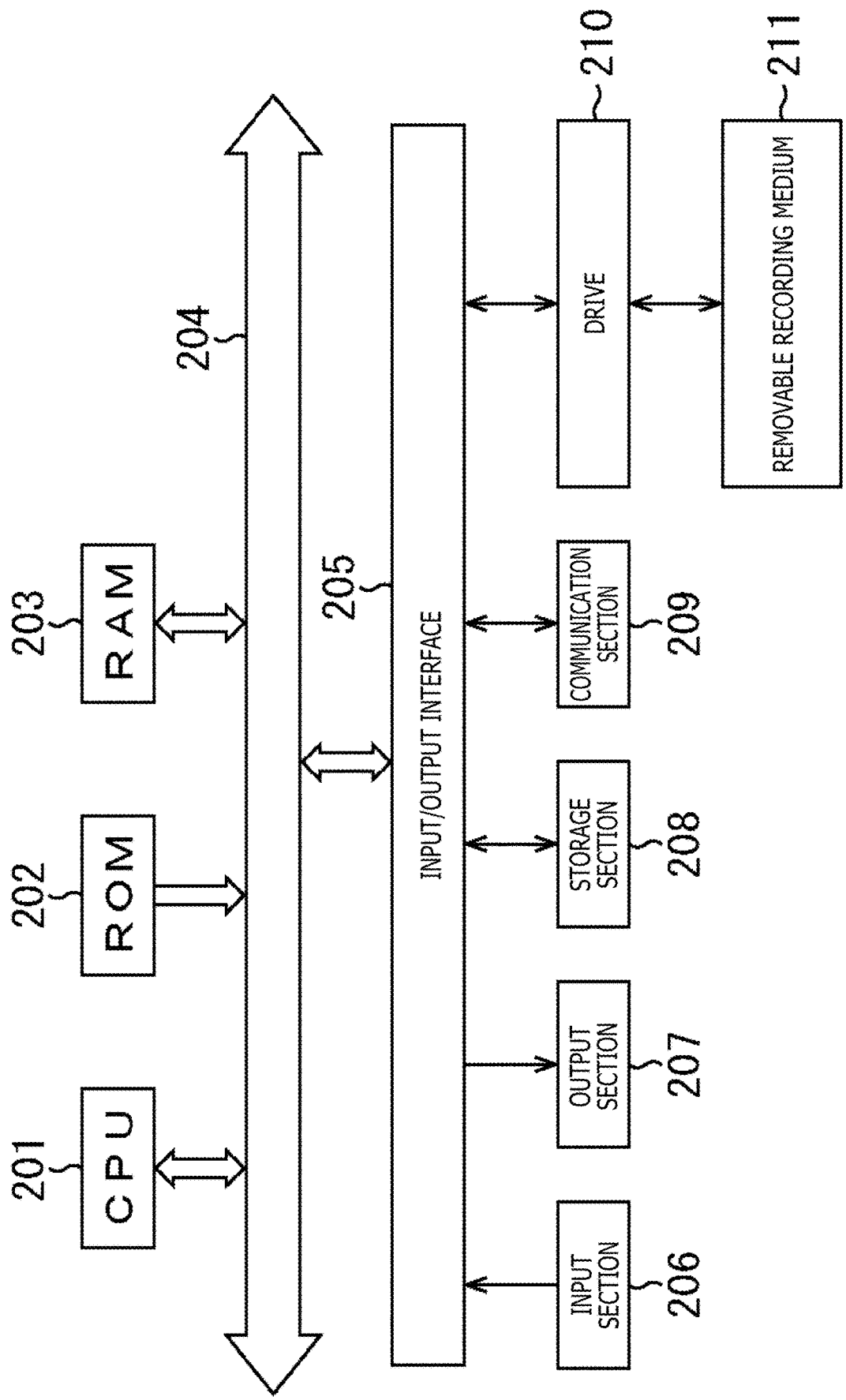
FIG. 22 is a block diagram depicting a configuration example of one embodiment of a computer to which the present technique is applied.

FIG. 22 is a block diagram depicting a hardware configuration example of a computer that executes the abovementioned processing series according to a program.

In the computer, a CPU (Central Processing Unit) 201, a ROM (Read Only Memory) 202, and a RAM (Random Access Memory) 203 are mutually connected via a bus 204.

Further, an input/output interface 205 is connected to the bus 204. An input section 206, an output section 207, a storage section 208, a communication section 209, and a drive 210 are connected to the input/output interface 205.

The input section 206 includes a keyboard, a mouse, a microphone, a touch panel, an input terminal, or the like. The output section 207 includes a display, a loudspeaker, an output terminal, or the like. The storage section 208 includes a hard disk, a RAM disk, a nonvolatile memory, or the like. The communication section 209 includes a network interface or the like. The drive 210 drives a removable recording medium 211 such as a magnetic disk, an optical disk, a magneto-optical disk, or a semiconductor memory.

In the computer having the abovementioned configuration, the CPU 201 loads a program stored in the storage section 208, for example, into the RAM 203 via the input/output interface 205 and the bus 204 and executes the program. Accordingly, the abovementioned processing series is executed. In addition, data necessary for the CPU 201 to execute various processes is also stored in the RAM 203, as appropriate.

In the computer, when the removable recording medium 211 is attached to the drive 210, the program can be installed into the storage section 208 via the input/output interface 205. Also, the program can be installed into the storage section 208, by being received at the communication section 209 via a wired or wireless transmission medium such as a local area network, the internet, or digital satellite broadcasting. Alternatively, the program can be installed in advance in the ROM 202 or the storage section 208.

It is to be noted that, in the program which is to be executed by the computer, processes may be executed in the time-series order that has been explained in the present description or may be executed in parallel or at respective necessary timings such as a timing at which a call is made.

In the present description, a system means a set of multiple constituent components (devices, modules (components), etc.), and whether or not all the constituent components are included in the same casing does not matter. Therefore, a set of multiple devices that are housed in different casings and are connected to one another over a network is a system, and further, a single device having multiple modules housed in a single casing is also a system.

The embodiments according to the present technique are not limited to the abovementioned embodiment, and various modifications can be made within the scope of the gist of the present technique.

In the abovementioned embodiment, the example in which a predetermined one of plural RUs in a channel is set as a CRU has been explained. However, the number of RUs to be set as CRUs may be two or more. For example, in a case where CRUs include a first RU and a second RU, a combination of the sub-carrier positions of control tones in the first RU and the sub-carrier positions of control tones in the second RU can be used to set control tones to identify various control information sets such as those in FIG. 6.

For example, an embodiment obtained by freely combining portions of the abovementioned embodiment together can be adopted.

For example, the present technique can be configured by cloud computing in which one function is shared and cooperatively processed by multiple devices over a network.

Further, for example, the steps explained in the abovementioned flowcharts can be executed by a single device or can be executed cooperatively by multiple devices.

Also, in a case where multiple processes are included in one step, the multiple processes included in the one step can be executed by a single device or can be executed cooperatively by multiple devices.

The steps set forth in the flowcharts in the present description can be executed in the described time-series order but do not necessarily need to be processed in this time-series order. The steps may be executed in parallel or may be executed at respective necessary timings such as a timing at which a call is made.

It is to be noted that the effects set forth in the present description are mere examples and are not limitative. Thus, any other effect may be provided.

It is to be noted that the present technique may also have the following configurations.

(1)

A wireless communication device including:

an OFDM signal generation section that generates an OFDM signal in which at least one of plural resource units obtained by channel band division is set as a control information resource unit for transmitting control information.

(2)

The wireless communication device according to (1), in which the OFDM signal generation section generates the OFDM signal such that an average power value in the control information resource unit is lower than that in another one of the resource units.

(3)

The wireless communication device according to (1) or (2), in which the OFDM signal generation section generates the OFDM signal such that, in a case where a position of the control information resource unit among the plural resource units is different, different BSSs are used.

(4)

The wireless communication device according to any one of (1) to (3), in which the control information resource unit includes plural BSS identification sub-carriers that are sub-carriers for identifying a BSS, and the OFDM signal generation section generates the OFDM signal such that, in a case where a position of the control information resource unit matches with that for a separate BSS, the positions of the BSS identification sub-carriers do not match with positions of the BSS identification sub-carriers for the separate BSS.

(5)

The wireless communication device according to any one of (1) to (4), in which power of each sub-carrier in the control information resource unit is first power or second power that is lower than the first power.

(6)

The wireless communication device according to (5), in which plural sets of the control information are transmitted through the control information resource unit, and the OFDM signal generation section generates the OFDM signal in which the number of sub-carriers, other than a reference tone, each having the first power is equal to the number of the control information sets to be transmitted.

(7)

The wireless communication device according to (5) or (6), in which the first power is equal to power of a sub-carrier in another one of the resource units that is not the control information resource unit.

(8)

A wireless communication method including:

by a wireless communication device, generating an OFDM signal in which at least one of plural resource units obtained by channel band division is set as a control information resource unit for transmitting control information.

(9)

A wireless communication device including:

a reception section that receives an OFDM signal in which at least one of plural resource units obtained by channel band division is set as a control information resource unit for transmitting control information.

(10)

The wireless communication device according to (9), in which the reception section receives the OFDM signal in which an average power value in the control information resource unit is set to be lower than that in another one of the resource units.

(11)

The wireless communication device according to (9) or (10), in which the reception section receives the OFDM signal that is set such that, in a case where a position of the control information resource unit among the plural resource units is different, different BSSs are used.

(12)

The wireless communication device according to any one of (9) to (11), further including:

an acquisition section that acquires the control information according to a sub-carrier position in the control information resource unit.

(13)

The wireless communication device according to any one of (9) to (12), further including:

a detection section that detects the control information resource unit on the basis of an average power value of each resource unit.

(14)

The wireless communication device according to (13), in which, by comparing power of the sub-carrier in the control information resource unit with a predetermined threshold, the detection section determines whether the sub-carrier is a control tone having first power or a dummy tone having second power that is lower than the first power.

(15)

The wireless communication device according to (13) or (14), in which, by comparing the power of the sub-carrier in the control information resource unit with power of a reference tone, the detection section determines whether the sub-carrier is the control tone having the first power or the dummy tone having the second power that is lower than the first power.

(16)

The wireless communication device according to (14) or (15), in which plural sets of the control information are transmitted through the control information resource unit, and the detection section determines whether or not the number of the control tones other than the reference tone is equal to the number of the control information sets to be transmitted.

(17)

The wireless communication device according to any one of (13) to (16), in which the detection section performs simple synchronization using a periodicity of a guard interval.

(18)

The wireless communication device according to any one of (13) to (17), in which one of the control information sets includes an error correction code, and by using the error correction code, the detection section determines whether or not acquisition of the control information has been performed successfully.

(18A)

The wireless communication device according to any one of (9) to (18), further including:

a control section that, on the basis of the control information having been received, decides whether or not to perform transmission from the wireless communication device.

(18B)

The wireless communication device according to any one of (9) to (18), further including:

a control section that, on the basis of the control information having been received, decides a transmission parameter to be used upon transmission from the wireless communication device.

(19)

The wireless communication device according to any one of (9) to (18), in which one of the control information sets includes transmission power information regarding a device that has transmitted the OFDM signal, and the wireless communication device further includes a control section that, by using the transmission power information, decides transmission power of the wireless communication device.

(20)

A wireless communication method including:
by a wireless communication device,
receiving an OFDM signal in which at least one of plural resource units obtained by channel band division is set as a control information resource unit for transmitting control information.

REFERENCE SIGNS LIST

AP (AP1, AP2) Base station, STA (STA1, STA2) Slave station, 20 Wireless communication device, 42 Control section, 43 Transmission section, 44 Reception section, 61 OFDM signal generation section, 83 OFDM signal demodulation section, 84 CRU detection section, 104 Control tone insertion section, 121 Simple time synchronization section, 122 Simple frequency synchronization section, 125 CRU determination section, 126 Control tone determination section, 201 CPU, 202 ROM, 203 RAM, 206 Input section, 207 Output section, 208 Storage section, 209 Communication section, 210 Drive

The invention claimed is:

1. A wireless communication device comprising:
a transmitter; and
OFDM signal generation circuitry that generates an OFDM signal in which at least one of plural resource units obtained by channel band division is set as a control information resource unit for transmitting control information,
wherein the OFDM signal generation circuitry generates the OFDM signal such that, in a case where a position of the control information resource unit among the plural resource units is different, different BSSs are used.

2. The wireless communication device according to claim 1, wherein the OFDM signal generation circuitry generates the OFDM signal such that an average power value in the control information resource unit is lower than that in another one of the resource units.

3. The wireless communication device according to claim 1, wherein
the control information resource unit includes plural BSS identification sub-carriers that are sub-carriers for identifying a BSS of the different BSSs, and
the OFDM signal generation circuitry generates the OFDM signal such that, in a case where a position of the control information resource unit matches with that for a BSS separate from the different BSSs, positions of the BSS identification sub-carriers do not match with positions of the BSS identification sub-carriers for the BSS separate from the different BSSs.

4. The wireless communication device according to claim 1, wherein power of each sub-carrier in the control information resource unit is first power or second power that is lower than the first power.

5. The wireless communication device according to claim 4, wherein
plural sets of the control information are transmitted through the control information resource unit, and
the OFDM signal generation circuity generates the OFDM signal in which a number of sub-carriers, other than a reference tone, each having the first power is equal to a number of the plural sets of the control information to be transmitted.

6. The wireless communication device according to claim 4, wherein the first power is equal to a power of a sub-carrier in another one of the resource units that is not the control information resource unit.

7. A wireless communication method comprising:
generating, by a wireless communication device, an OFDM signal in which at least one of plural resource units obtained by channel band division is set as a control information resource unit for transmitting control information,
wherein the OFDM signal is set such that, in a case where a position of the control information resource unit among the plural resource units is different, different BSSs are used; and
transmitting the OFDM signal.

8. A wireless communication device comprising:
reception circuitry that receives an OFDM signal in which at least one of plural resource units obtained by channel band division is set as a control information resource unit for transmitting control information,
wherein the OFDM signal is set such that, in a case where a position of the control information resource unit among the plural resource units is different, different BSSs are used; and
a demodulator that demodulates the OFDM signal.

9. The wireless communication device according to claim 8, wherein the reception circuitry receives the OFDM signal in which an average power value in the control information resource unit is set to be lower than that in another one of the resource units.

10. The wireless communication device according to claim 8, further comprising:
acquisition circuitry that acquires the control information according to a position of a sub-carrier in the control information resource unit.

11. The wireless communication device according to claim 8, further comprising:
detection circuitry that detects the control information resource unit on a basis of an average power value of each resource unit.

12. The wireless communication device according to claim 11, wherein,
by comparing power of a sub-carrier in the control information resource unit with a predetermined threshold, the detection circuitry determines whether the sub-carrier is a control tone having first power or a dummy tone having second power that is lower than the first power.

13. The wireless communication device according to claim 11, wherein,
by comparing power of a sub-carrier in the control information resource unit with power of a reference tone, the detection circuitry determines whether the sub-carrier is a control tone having first power or a dummy tone having second power that is lower than the first power.

14. The wireless communication device according to claim 12, wherein
plural sets of the control information are transmitted through the control information resource unit, and
the detection circuitry determines whether or not a number of the control tones other than a reference tone is equal to a number of the plural sets of the control information to be transmitted.

15. The wireless communication device according to claim 11, wherein the detection circuity performs simple synchronization using a periodicity of a guard interval.

16. The wireless communication device according to claim 14, wherein
- one of the plural sets of the control information includes an error correction code, and
- by using the error correction code, the detection circuitry determines whether or not acquisition of the control information has been performed successfully.

17. The wireless communication device according to claim 14, wherein
- one of the plural sets of the control information includes transmission power information regarding a device that has transmitted the OFDM signal, and
- the wireless communication device further includes control circuitry that, by using the transmission power information, decides transmission power of the wireless communication device.

18. A wireless communication method comprising:
- receiving, by a wireless communication device, an OFDM signal in which at least one of plural resource units obtained by channel band division is set as a control information resource unit for transmitting control information,
- wherein the OFDM signal is set such that, in a case where a position of the control information resource unit among the plural resource units is different, different BSSs are used; and
- demodulating the OFDM signal.

* * * * *